(12) United States Patent
Yamamoto

(10) Patent No.: US 7,933,306 B2
(45) Date of Patent: Apr. 26, 2011

(54) TRANSMITTING METHOD, RECEIVING METHOD, TRANSMITTING DEVICE, RECEIVING DEVICE AND TRANSCEIVING DEVICE FOR AN ULTRA-WIDEBAND COMMUNICATION SYSTEM

(75) Inventor: Naotake Yamamoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 926 days.

(21) Appl. No.: 10/582,974

(22) PCT Filed: Aug. 30, 2005

(86) PCT No.: PCT/JP2005/016204
§ 371 (c)(1),
(2), (4) Date: Jun. 15, 2006

(87) PCT Pub. No.: WO2006/025577
PCT Pub. Date: Mar. 9, 2006

(65) Prior Publication Data
US 2007/0147475 A1    Jun. 28, 2007

(30) Foreign Application Priority Data

Sep. 2, 2004   (JP) .................................. 2004-255289

(51) Int. Cl.
H04B 1/00           (2006.01)
(52) U.S. Cl. ........ 375/130; 375/170; 375/259; 375/267; 370/203; 714/746; 714/758; 714/801; 714/790; 455/102; 455/101; 455/553.1
(58) Field of Classification Search ................. 375/170, 375/259, 130, 267; 370/203; 714/746, 758, 714/801, 790; 455/102, 101, 553.1
See application file for complete search history.

(56) References Cited

U.S. PATENT DOCUMENTS 6,031,862 A * 2/2000 Fullerton et al. .............. 375/146
(Continued)

FOREIGN PATENT DOCUMENTS

JP          10-508725          8/1998
(Continued)

OTHER PUBLICATIONS

Naotake Yamamoto et al. "Adaptive Internally Turbo-Coded Ultra Wideband-Impulse Radio (AITC-UWB-IR) System", ICC 2003, 2003 IEEE International Conference on Communications, Anchorage, AK, May 11-15, 2003, IEEE International Conference on Communications, New York, NY: IEEE, US, vol. 1 of 5, May 11, 2003, pp. 3535-3539.

Nathaniel J. August et al., "An Adaptive UWB Modulation Scheme for Optimization of Energy, BER, and Data Rate", Ultra Wideband Systems, 2004, Joint with Conference on Ultrawideband Systems and Technologies, Joint UWBST & IWUWBS, 2004, International Workshop on Kyoto, Japan, May 18-21, 2004, Piscataway, NJ, USA, IEEE, May 18, 2004, pp. 182-186.

(Continued)

*Primary Examiner* — Chieh M Fan
*Assistant Examiner* — Santiago Garcia
(74) *Attorney, Agent, or Firm* — Wenderoth, Lind & Ponack, L.L.P.

(57) ABSTRACT

A transmitting device of the present invention comprises an encoder (20), a transmitting unit (100) including a pulse generator (30) and a parallel-to-serial converter (50), a transmitting control unit (40), and an antenna (90). The pulse generator (30) comprises a first pulse train generator (31), a second pulse train generator (32), . . . and an n-th pulse train generator (33). A k-bit information bit train is inputted from the information signal source (10), The encoder (20) encodes the k-bit information bit train into an n-bit encoded bit train at a coded rate of (k/n). The pulse generator (30) generates n-piece repetitive pulse trains corresponding to the n-bit encoded bit train. The antenna (90) transmits the n-piece repetitive pulse trains as UWB-IR.

5 Claims, 15 Drawing Sheets

U.S. PATENT DOCUMENTS

| | | | |
|---|---|---|---|
| 6,310,906 B1 * | 10/2001 | Abarbanel et al. | 375/130 |
| 6,430,208 B1 * | 8/2002 | Fullerton et al. | 375/130 |
| 2003/0099280 A1 * | 5/2003 | Kumar et al. | 375/130 |
| 2003/0162498 A1 * | 8/2003 | Rofheart et al. | 455/41 |
| 2003/0174779 A1 * | 9/2003 | Sugaya et al. | 375/259 |
| 2003/0194979 A1 * | 10/2003 | Richards et al. | 455/216 |
| 2004/0047284 A1 * | 3/2004 | Eidson | 370/203 |
| 2008/0285663 A1 * | 11/2008 | Fischer | 375/259 |
| 2009/0022207 A1 * | 1/2009 | Brethour et al. | 375/130 |

FOREIGN PATENT DOCUMENTS

| | | |
|---|---|---|
| JP | 2004-72589 | 3/2004 |

OTHER PUBLICATIONS

Naotake Yamamoto et al., "Performance Evaluation of Internally Turbo-Coded Ultra Wideband-Impulse Radio (ITC-UWB-IR) System", The Institute of Electronics, Information and Communication Engineers, Technical Report of IEICE.

S. Yoshida et al., "Performance Evaluation of Adaptive Internally Turbo Coded Ultra Wideband-Impulse Radio (AITC-UWB-IR) in Multipath Channels", The Institute of Electronics, Information and Communication Engineers, Technical Report of IEICE, WBS2004-9, Jun. 2004, pp. 43-48 (along with English abstract).

Naotake Yamamoto et al. "Adaptive Internally Turbo-Coded Ultra Wideband-Impulse Radio (AITC-UWB-IR) System", ICC 2003, 2003 IEEE International Conference on Communications, Anchorage, AK, May 11-15, 2003, IEEE International Conference on Communications, New York, NY: IEEE, US, vol. 1 of 5, May 11, 2003, pp. 3535-3539.

Nathaniel J. August et al., "An Adaptive UWB Modulation Scheme for Optimization of Energy, BER, and Data Rate", Ultra Wideband Systems, 2004, Joint with Conference on Ultrawideband Systems and Technologies, Joint UWBST & IWUWBS, 2004, International Workshop on Kyoto, Japan, May 18-21, 2004, Piscataway, NJ, USA, IEEE, May 18, 2004, pp. 182-186.

Naotake Yamamoto et al., "Performance Evaluation of Internally Turbo-Coded Ultra Wideband-Impulse Radio (ITC-UWB-IR) System", The Institute of Electronics, Information and Communication Engineers, Technical Report of IEICE.

* cited by examiner template wave shape R(t)

received p-pulse wave shape p(t)

received q-pulse wave shape q(t)

TRANSMITTING METHOD, RECEIVING METHOD, TRANSMITTING DEVICE, RECEIVING DEVICE AND TRANSCEIVING DEVICE FOR AN ULTRA-WIDEBAND COMMUNICATION SYSTEM

TECHNICAL FIELD

The present invention relates to a transmitting device and a receiving device used for a UWB (Ultra Wideband) communication system, and an art related thereto.

BACKGROUND ART

In recent years, UWB (Ultra Wideband) communication technology has attracted attention as next-generation wireless-communication technology. The UWB communication technology is a high-speed wideband communication technology of a spread spectrum type using a radio wave with a large fractional bandwidth. The UWB communication technology can be used for a high-speed indoor multi-points-connection radio communication method.

As a method of generating a signal used for the UWB communication, there is a method of transmitting a continuous chain of impulses with a short duration, directly from an antenna. The UWB communication method using such a continuous chain of impulses is called a UWB-IR (Ultra Wideband-Impulse Radio) method. The continuous chain of impulses is hereinafter called a repetitive pulse train.

Document 1 (Japanese translation of PCT international application H10-508725) discloses, as an example of the UWB-IR method, an art which transmits data by transmitting a series of pulses with a duration in nanoseconds without using a carrier wave. The art has a feature of transmitting a signal with a transmitting level lower than an environmental noise level over an extremely wide frequency band; thereby the art can reduce electric power consumption as compared to the conventional radio communication with a carrier wave. Since the ultra short pulse is used, the art possesses such advantages that the art enables high-speed communications and is strong against multi-pass interference.

In the UWB-IR method, information is put on a repetitive pulse train to be sent. It is considered that the UWB-IR method uses a repetitive code because the UWB-IR transmits repetitively a plurality of pulses for one bit of information bit train. Document 2 (Naotake Yamamoto and Tomoaki Otsuki; "Evaluation of Characteristics of Internally Turbo-Coded Ultra Wideband-Impulse Radio (ITC-UWB-IR) Method", Institute of Electronics, Information and Communication Engineers, technical report RCS2002-55, pp. 25-30, May 2002.) has proposed "an internal turbo code UWB-IR method" as a method incorporating an error correcting code instead of the repetitive code. The error correcting code incorporated is considered more powerful than the repetitive code.

FIG. 16 is a block diagram of the conventional UWB transmitting device, and shows in detail a transmitter part of "the internal turbo code UWB-IR method" which is disclosed in Document 2.

As shown in FIG. 16, the conventional UWB transmitting device comprises an encoder 1, a serial-to-parallel converter 2, a pulse generator 3, a parallel-to-serial converter 4 and an antenna 5. An information bit train from an information signal source S is encoded to an n-bit serial turbo encoded bit train by the encoder 1, and is converted into an n-bit parallel encoded bit train by the serial-to-parallel converter 2. The pulse generator 3 has n-piece repetitive pulse generators 3_1-3_n, inputs n-bit parallel coded bits, and outputs n-piece pulse trains in parallel. Each of the n-piece pulse trains comprises tens of to hundreds of repetitive pulses which have been generated corresponding to each coded bit. The n-piece pulse trains are parallel-to-serial converted by the parallel-to-serial converter 4, and are directly transmitted from the antenna 5.

In the conventional UWB transmitting device shown in FIG. 16, when Ns-piece pulses in total are transmitted repetitively per one bit of the information bit train, each of the n sets of repetitive pulse generators 3_1 to 3_n generates (Ns/n)-piece repetitive pulses, respectively.

FIG. 17 is a block diagram of the conventional UWB receiving device, and shows in detail a receiver part of "the internal turbo code UWB-IR method" which is disclosed in Document 2.

As shown in FIG. 17, the conventional UWB receiving device comprises the antenna 5, a pulse wave-shape correlator 6, a pulse train integrator 7, a decoder 8 and a decision circuit 9. As for received pulses received by the antenna 5, correlation with a template wave shape is taken in the pulse wave-shape correlator 6. In the pulse train integrator 7, the correlation values are integrated as many as the number of the repetitive pulses. After a soft decision of a code is made in the decoder 8 which decodes a turbo code using the integrated correlation value, a hard decision is made, and an information bit train is restored and outputted as a decoded information signal in the decision circuit 9.

According to the conventional technology with the internal turbo code disclosed in Document 2, error rate characteristics can be improved without reducing transmission speed as compared with the UWB-IR method, by controlling the coded rates (1/n) in the encoder and the number of repetitive pulses (Ns) of the UWB-IR method, depending on a state of communication path or required quality.

In the above-mentioned conventional technology, the equal number of pulses as the (Ns/n)-piece of repetitive pulses are generated repetitively to each bit of the n-bit encoded bit train; therefore significance of every encoded bit is equal. That is, the conventional technology mentioned above does not take into consideration changing in the significance of the encoded bits adaptively in consideration of the state of the communication path; hence, measures against changes of the state of the communication path are insufficient. Accordingly, adaptive measures are difficult to be performed, by allotting many repetitive pulses to an encoded bit which is susceptible to adverse effect by noises and interference from other users, or by allotting, on the other hand, less repetitive pulses to an encoded bit which is hard to be influenced by the adverse effect. Furthermore, there is restriction that the number of repetitive pulses which the pulse generator 3 generates must always be a multiple of "n" when the coded rate of the encoder 1 is (k/n).

DISCLOSURE OF INVENTION

An object of the present invention is to provide a transmitting device and a receiving device for an ultra wideband communication system and an art related thereto, the transmitting and receiving devices being able to perform high-quality data transmission without reducing transmission speed, by lifting the restriction over the number of repetitive pulses in the UWB-IR method and by posing weighting on the encoded bits.

A first aspect of the present invention provides a transmitting method in an ultra-wideband communication system performing communications by sending repetitive pulse trains to a communication path, the transmitting method comprising: assuming that m-piece pulses are transmitted per one bit of information bits ("m" is a natural number not less than 2), and that a coded rate is (k/n) ("k" is a natural number not less than 1, and "n" is a natural number not less than 2); transforming a k-bit information bit train to (k*m)-piece pulses in total; and transmitting sequentially the (k*m)-piece pulses to the communication path. The (k*m)-piece pulses are composed of n-piece repetitive pulse trains, and at least two pieces of the n-piece repetitive pulse trains possess lengths different from each other.

According to the present method, it is possible to provide transmitting technology of the UWB-IR method which can adaptively adjust the number of the repetitive pulses to be allotted to the encoded bits.

A second aspect of the present invention provides a receiving method in an ultra-wideband communication system performing communications by sending repetitive pulse trains to a communication path, the receiving method comprising: receiving a transmit signal as n-piece received pulse trains, the transmit signal being n-piece repetitive pulse trains transmitted after a k-bit information bit train is encoded to an n-bit encoded bit train at a coded rate of (k/n) ("k" is a natural number not less than 1, and "n" is a natural number not less than 2), and subsequently the n-bit encoded bit train is transformed to the n-piece repetitive pulse trains; outputting number of repetitive pulses composing each of the n-piece received pulse trains, based on pulse train information or bit train information received beforehand; correlating individually pulses composing the n-piece received pulse trains with a predetermined template wave shape, thereby outputting correlation values; integrating the correlation values as many as the number of repetitive pulses, thereby providing n-piece integrated values; making soft decision for the n-piece received pulse trains based on the n-piece integrated values, thereby outputting the soft decision results for n bits; and making hard decision in decoding for the n-piece received pulse trains based on the soft decision results for n bits, thereby outputting the k-bit information bit train as a decoded information signal.

According to the present method, it is possible to provide receiving technology of the UWB-IR method which can adaptively adjust the number of the repetitive pulses to be allotted to the encoded bits.

A third aspect of the present invention provides a transmitting device usable in an ultra-wideband communication system performing communications by sending repetitive pulse trains to a communication path, the transmitting device comprising: an encoder and a transmitting unit. The encoder is operable to encode a k-bit information bit train to an n-bit encoded bit train at a coded rate of (k/n) ("k" is a natural number not less than 1, and "n" is a natural number not less than 2), on condition that m-piece pulses are transmitted per one bit of information bits ("m" is a natural number not less than 2) and the coded rate is (k/n). The transmitting unit is operable to generate n-piece repetitive pulse trains based on the n-bit encoded bit train encoded by the encoder, thereby transmitting sequentially the n-piece repetitive pulse trains to the communication path. In the transmitting device, pulses included in the n-piece repetitive pulse trains transmitted by the transmitting unit amount to (k*m) pieces in total, and at least two pieces of the n-piece repetitive pulse trains are composed of repetitive pulses of different numbers.

According to the present structure, the transmitting device of the UWB-IR method which can adaptively adjust the number of the repetitive pulses to be allotted to the encoded bits can be provided.

A fourth aspect of the present invention provides the transmitting device as defined in the third aspect, further comprising: a transmitting control unit operable to generate control information on number of the repetitive pulses included in each train of the n-piece repetitive pulse trains transmitted by the transmitting unit.

A fifth aspect of the present invention provides the transmitting device as defined in the fourth aspect, wherein the transmitting control unit is operable to acquire communication path information on the communication path, thereby generating the control information based on the acquired communication path information.

According to the present structures, the number of repetitive pulses of n-piece repetitive pulse trains which the transmitting unit transmits can be determined according to the control information which the transmitting control unit generates. Furthermore, the control information can be changed according to the state of the communication path.

A sixth aspect of the present invention provides the transmitting device as defined in the fourth aspect, wherein the transmitting control unit comprises: a pulse generator operable, in accordance with the control information generated by the transmitting control unit, to repetitively generate a plurality of pulses for each encoded bit of the n-bit encoded bit train encoded by the encoder, thereby outputting the n-piece repetitive pulse trains, the plurality of pulses being predetermined according to a kind of each encoded bit.

According to the present structure, the transmitting device of the UWB-IR method which can adaptively adjust the number of the repetitive pulses to be allotted to the encoded bits can be provided. Furthermore, since the number of the repetitive pulses which the pulse generator generates can be controlled by the transmitting control unit, the transmitting device with a clear functional allotment can be provided.

A seventh aspect of the present invention provides the transmitting device as defined in the sixth aspect, wherein the transmitting control unit is operable to transmit, as pulse train information, the number of repetitive pulses of the n-piece repetitive pulse trains generated by the pulse generator.

According to the present structure, since the number of repetitive pulses of each of the repetitive pulse trains is transmitted to a receiving device as the pulse train information, the receiving device can determine, using the pulse train information, an integration interval over which correlation values, obtained after correlating received pulses and a template pulse, are integrated. Consequently, highly precise decoding of a received signal becomes possible.

An eighth aspect of the present invention provides the transmitting device as defined in the fourth aspect, wherein the encoder outputs the n-bit encoded bit train in the form of an n-bit parallel format encoded bit train, and wherein the transmitting unit comprises: a pulse generator and a parallel-to-serial converter. The pulse generator is operable to repetitively generate a plurality of pulses for each encoded bit of the n-bit parallel format encoded bit train outputted by the encoder, thereby outputting n-piece parallel format repetitive pulse trains, the plurality of pulses being predetermined according to a kind of each encoded bit. The parallel-to-serial converter is operable to convert the n-piece parallel format repetitive pulse trains outputted by the pulse generator to n-piece serial format repetitive pulse trains, thereby sequentially transmitting the n-piece serial format repetitive pulse trains to the communication path. In the transmitting unit, the pulse generator determines, in accordance with the control information generated by the transmitting control unit, the number of each repetitive pulses composing the n-piece repetitive pulse trains, in such a manner that pulses included in the n-piece repetitive pulse trains amount to (k*m) pieces in total, and at least two pieces of the n-piece repetitive pulse trains are composed of repetitive pulses of different numbers.

According to the present structure, by using the encoder which outputs the parallel format encoded bit train to be fed to the pulse generator, it is possible to provide the transmitting device of the UWB-IR method operable to generate in parallel a plurality of repetitive pulse trains, each of which is composed of repetitive pulses different in number.

A ninth aspect of the present invention provides the transmitting device as defined in the fourth aspect, wherein the encoder outputs the n-bit encoded bit train in the form of an n-bit serial format encoded bit train, and wherein the transmitting unit comprises: a serial-to-parallel converter, a pulse generator, and a parallel-to-serial converter. The serial-to-parallel converter is operable to convert the n-bit serial format encoded bit train outputted by the encoder to an n-bit parallel format encoded bit train. The pulse generator is operable to repetitively generate a plurality of pulses for each encoded bit of the n-bit parallel format encoded bit train outputted by the encoder, thereby outputting n-piece parallel format repetitive pulse trains, the plurality of pulses being predetermined according to a kind of each encoded bit. The parallel-to-serial converter is operable to convert the n-piece parallel format repetitive pulse trains outputted by the pulse generator to n-piece serial format repetitive pulse trains, thereby sequentially transmitting the n-piece serial format repetitive pulse trains to the communication path.

In the transmitting unit, the pulse generator determines, in accordance with the control information generated by the transmitting control unit, the number of each repetitive pulses composing the n-piece repetitive pulse trains, in such a manner that pulses included in the n-piece repetitive pulse trains amount to (k*m) pieces in total, and at least two pieces of the n-piece repetitive pulse trains are composed of repetitive pulses of different numbers.

According to the present structure, by using the encoder which outputs a serial format encoded bit train, and changing the encoder output to a parallel format encoded bit train to be fed to the pulse generator, it is possible to provide the transmitting device of the UWB-IR method operable to generate in parallel a plurality of repetitive pulse trains, each of which is composed of repetitive pulses different in number.

A tenth aspect of the present invention provides the transmitting device as defined in the fourth aspect, wherein the transmitting unit comprises: a bit train generator operable to repeat, for a plurality of times, each bit of the n-bit encoded bit train encoded by the encoder to generate n-piece repetitive bit trains; and a pulse generator operable to generate a pulse for each bit of the n-piece repetitive bit trains generated by the bit train generator, the pulse being predetermined according to a kind of each bit, thereby transmitting the generated pulse to the communication path. In the transmitting unit, the bit train generator determines, in accordance with the control information generated by the transmitting control unit, the number of each repetitive bits composing the n-piece repetitive bit trains, in such a manner that bits included in the n-piece repetitive bit trains amount to (k*m) pieces in total, and at least two pieces of the n-piece repetitive bit trains are composed of repetitive bits of different numbers.

According to the present structure, it is possible to provide the transmitting device of the UWB-IR method which can adaptively adjust the number of the repetitive pulses to send out. Moreover, all processing up to generating the n-piece repetitive bit trains can be realized in digital processing.

An eleventh aspect of the present invention provides the transmitting device as defined in the tenth aspect, wherein the transmitting control unit is operable to transmit, as bit train information, the number of repetitive bits of the n-piece repetitive bit trains generated by the bit train generator.

According to the present structure, since the number of repetitive bits of each of the repetitive bit trains is transmitted to a receiving device as the bit train information, the receiving device can determine, using the bit train information, an integration interval over which correlation values, obtained after correlating received pulses and a template pulse, are integrated. Consequently, highly precise decoding of a received signal becomes possible.

A twelfth aspect of the present invention provides a receiving device usable in an ultra-wideband communication system performing communications by sending repetitive pulse trains to a communication path, the receiving device comprising: a receiving unit, a pulse wave-shape correlator, a receiving control unit, an integrator, a decoder, and a decision unit.

The receiving unit is operable to receive a transmit signal as n-piece received repetitive pulse trains, the transmit signal being n-piece repetitive pulse trains transmitted after a k-bit information bit train is encoded to an n-bit encoded bit train at a coded rate of (k/n) ("k" is a natural number not less than 1, and "n" is a natural number not less than T), and subsequently the n-bit encoded bit train is transformed to the n-piece repetitive pulse trains.

The pulse wave-shape correlator is operable to correlate individually pulses composing the n-piece received repetitive pulse trains with a predetermined template wave shape, thereby outputting n-piece repetitive correlation value trains in correspondence with the n-piece received repetitive pulse trains.

The receiving control unit is operable to output, based on pulse train information or bit train information received beforehand, n-piece repetition numbers for the n-piece repetitive correlation value trains outputted by the pulse wave-shape correlator.

The integrator is operable to divide into n intervals the n-piece repetitive correlation value trains outputted by the pulse wave-shape correlator, in accordance with the n-piece repetition numbers outputted by the receiving control unit, and to integrate the n-piece repetitive correlation value trains for each divided interval, thereby outputting n-piece integrated values.

The decoder is operable to make soft decision for the n-piece received repetitive pulse trains based on the n-piece integrated values outputted by the integrator, thereby outputting the soft decision results for n bits.

The decision unit is operable to make hard decision in decoding for the n-piece received pulse trains based on the soft decision results for n bits outputted by the decoder, thereby outputting the k-bit information bit train as a decoded information signal.

According to the present structure, it is possible to provide the receiving device which receives a transmit signal of the UWB-IR method in which the number of the repetitive pulses to be allotted to the encoded bits is adaptively adjusted. Furthermore, by the use of the pulse train information or the bit train information received beforehand, it is possible to determine the integration interval over which correlation values, obtained after correlating received pulses and a template pulse, are integrated. Consequently, highly precise decoding of a received signal becomes possible.

A thirteenth aspect of the present invention provides a transceiving device usable in an ultra-wideband communication system performing communications by sending repetitive pulse trains to a communication path, the transceiving device comprising: an encoder, a transmitting unit, a transmitting control unit, a receiving unit, a pulse wave-shape correlator, a receiving control unit, an integrator, a decoder, and a decision unit.

The encoder is operable to encode a k-bit information bit train to an n-bit encoded bit train at a coded rate of (k/n) ("k" is a natural number not less than 1, and "n" is a natural number not less than 2), on condition that m-piece pulses are transmitted per one bit of information bits ("m" is a natural number not less than 2) and the coded rate is (k/n). The transmitting unit is operable to generate n-piece repetitive pulse trains based on the n-bit encoded bit train encoded by the encoder, thereby transmitting sequentially the n-piece repetitive pulse trains to the communication path. Furthermore, the transmitting control unit is operable to generate control information on number of the repetitive pulses included in each train of the n-piece repetitive pulse trains transmitted by the transmitting unit.

The receiving unit is operable to receive n-piece repetitive pulse trains through the communication path, as n-piece received repetitive pulse trains. The pulse wave-shape correlator is operable to correlate individually pulses composing the n-piece received repetitive pulse trains with a predetermined template wave shape, thereby outputting n-piece repetitive correlation value trains in correspondence with the n-piece received repetitive pulse trains. The receiving control unit is operable to output, based on pulse train information or bit train information received beforehand, n-piece repetition numbers for the n-piece repetitive correlation value trains outputted by the pulse wave-shape correlator. The integrator is operable to divide into n intervals the n-piece repetitive correlation value trains outputted by the pulse wave-shape correlator, in accordance with the n-piece repetition numbers outputted by the receiving control unit, and to integrate the n-piece repetitive correlation value trains for each divided interval, thereby outputting n-piece integrated values. The decoder is operable to make soft decision for the n-piece received repetitive pulse trains based on the n-piece integrated values outputted by the integrator, thereby outputting the soft decision results for n bits. Furthermore, the decision unit is operable to make hard decision in decoding for the n-piece received pulse trains based on the soft decision results for n bits outputted by the decoder, thereby outputting the k-bit information bit train as a decoded information signal.

In the transceiving device, pulses included in the n-piece repetitive pulse trains transmitted by the transmitting unit amount to (k*m) pieces in total, and at least two pieces of the n-piece repetitive pulse trains are composed of repetitive pulses of different numbers, and pulses included in the n-piece received pulse trains received by the receiving unit amount to (k*m) pieces in total, and at least two pieces of the n-piece repetitive pulse trains are composed of repetitive pulses of different numbers.

According to the present structure, the transceiving device of the UWB-IR method which can adaptively adjust the number of the repetitive pulses can be provided.

The above, and other objects, features and advantages of the present invention will become apparent from the following description read in conjunction with the accompanying drawings, in which like reference numerals designate the same elements.

BRIEF DESCRIPTION OF DRAWINGS

FIG. 13(*b*) is an illustration showing a received p-pulse wave shape according to Embodiment 6 of the present invention;

FIG. 13(*c*) is an illustration showing a received q-pulse wave shape according to Embodiment 6 of the present invention;

BEST MODE FOR CARRYING OUT THE INVENTION

Embodiments of the present invention are explained with reference to the following drawings.

Embodiment 1

Figure 1:
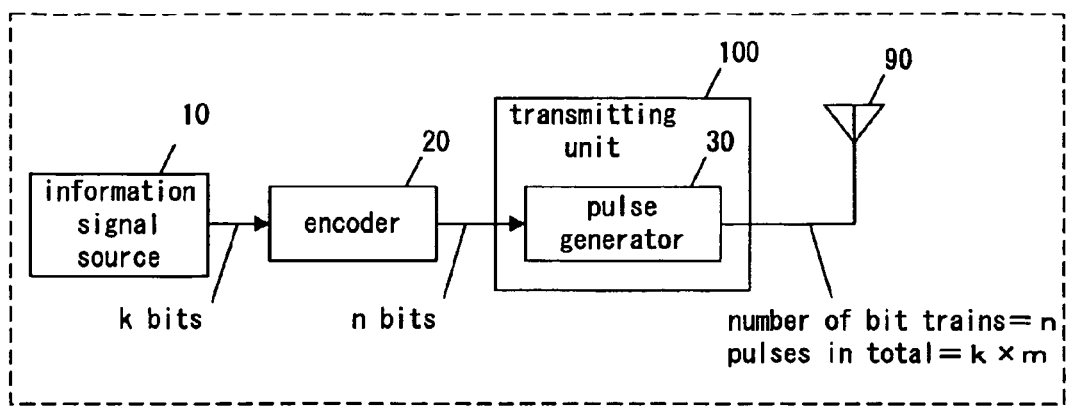
FIG. 1 is a block diagram of a transmitting device according to Embodiment 1 of the present invention.

FIG. 1 is a block diagram of a transmitting device according to Embodiment 1 of the present invention. As shown in FIG. 1, the transmitting device of the UWB-IR method of the present embodiment comprises an encoder 20, a transmitting unit 100, and an antenna 90. The transmitting unit 100 includes a pulse generator 30.

Hereinafter, operation of the transmitting device of the present embodiment is explained. A k-bit information bit train inputted from an information signal source 10 is encoded to an n-bit encoded bit train with a coded rate (k/n) by the encoder 20 ("k" is a natural number not less than "1", and "n" is a natural number not less than "2"). The n-bit encoded bit train is inputted into the pulse generator 30 of the transmitting unit 100. In the pulse generator 30, a series of tens of pulses to hundreds of pulses each having a short duration are generated repetitively per each bit of the n-bit encoded bit train, and the pulses are transmitted from the antenna 90. The series of pulses transmitted from the antenna 90 are, when observed in a time domain, signals with amplitude smaller than the amplitude of a surrounding noise; whereas, when observed in a frequency domain, the series of pulses are transmitted from the antenna 90 as radio waves with an extremely wide fractional bandwidth.

When the number of pulses which is to be transmitted repetitively per one bit of the information bits is m pieces ("m" is a natural number not less than "2"), the total of the pulses transmitted to the k-bit information bit train is (k*m) pieces. The total (k*m)-piece pulses correspond to the n-bit encoded bit train which the encoder 20 has outputted, and are composed of the n-piece repetitive pulse trains which the pulse generator 30 generates. Furthermore, each repetitive pulse train of the n-piece repetitive pulse trains is composed by repeating a pulse generated by pulse modulation of each bit of the n-bit encoded bit train according to the kind of the bit (namely, according to the bit being "0" or "1").

In the conventional UWB-IR method, the above-mentioned n-piece pulse trains are composed of pulses of equal numbers, irrespective of the kind of the encoded bit train. In the transmitting device of the present embodiment, the above-mentioned n-piece pulse trains are composed of pulses of different numbers. In other words, a pulse train which is weak to noises in a communication path is allotted increased number of pulses, and a pulse train which is strong to noises is allotted reduced number of pulses, while keeping the pulses transmitted for the n-piece pulse trains constant in total number. Thereby, the occurrence probability of a noise-caused error can be lowered.

Figure 10:
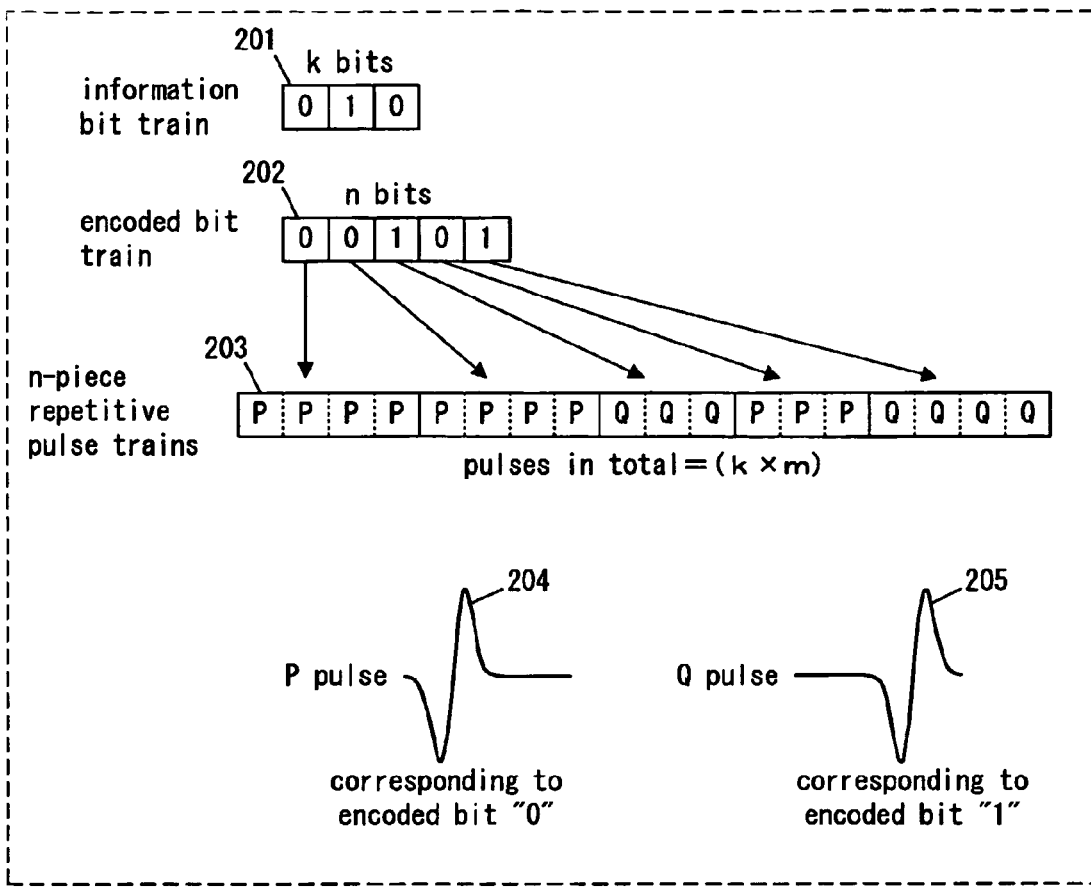
FIG. 10 is an explanatory drawing for generating repetitive pulse trains according to Embodiment 1 of the present invention.

FIG. 10 is an explanatory drawing for generating repetitive pulse trains according to Embodiment 1 of the present invention. In this drawing, a k-bit information bit train "010" 201 (k=3 in the example of FIG. 10) is encoded to an n-bit encoded bit train "00101" 202 (n=5 in the example of FIG. 10) at a coded rate (k/n=3/5 in the example of FIG. 10).

For the n-bit encoded bit train "00101" 202, n-piece repetitive pulse trains 203 (n=5 in the example of FIG. 10) are generated.

In FIG. 10, four P pulses are generated to the first bit "0" of the encoded bit train 202, four P pulses are generated to the second bit "0" of the encoded bit train 202, three Q pulses are generated to the third bit "1" of the encoded bit train 202, three P pulses are generated to the fourth bit "0" of the encoded bit train 202, and four Q pulses are generated to the fifth bit "1" of the encoded bit train 202. The total pulses of five repetitive pulse trains 203 are 18 pieces. In five repetitive pulse trains 203 of FIG. 10, the P pulse and the Q pulse are described with symbols "P" and "Q." The P pulse and the Q pulse are pulses which are set beforehand in correspondence with the kind of bits. In the transmitting device of the present embodiment, it is set that the P pulse corresponds to a bit "1" and the Q pulse corresponds to a bit "0", respectively.

Exemplary wave shapes of the P pulse 204 and the Q pulse 205, which are adopted in the transmitting device of the present embodiment, are shown at the bottom of FIG. 10. The P pulse and the Q pulse are pulses which modulate a bit "1" and a bit "0". As long as the P pulse and the Q pulse can discriminate each other, any kind of modulation method may be used. The example shown in FIG. 10 is a pulse position modulation (PPM) method using a dipulse. In addition, other modulation methods such as a pulse amplitude modulation (PAM), an ON/OFF keying modulation (OOK), and a bi-phase modulation (BPSK) may be used.

Figure 11:
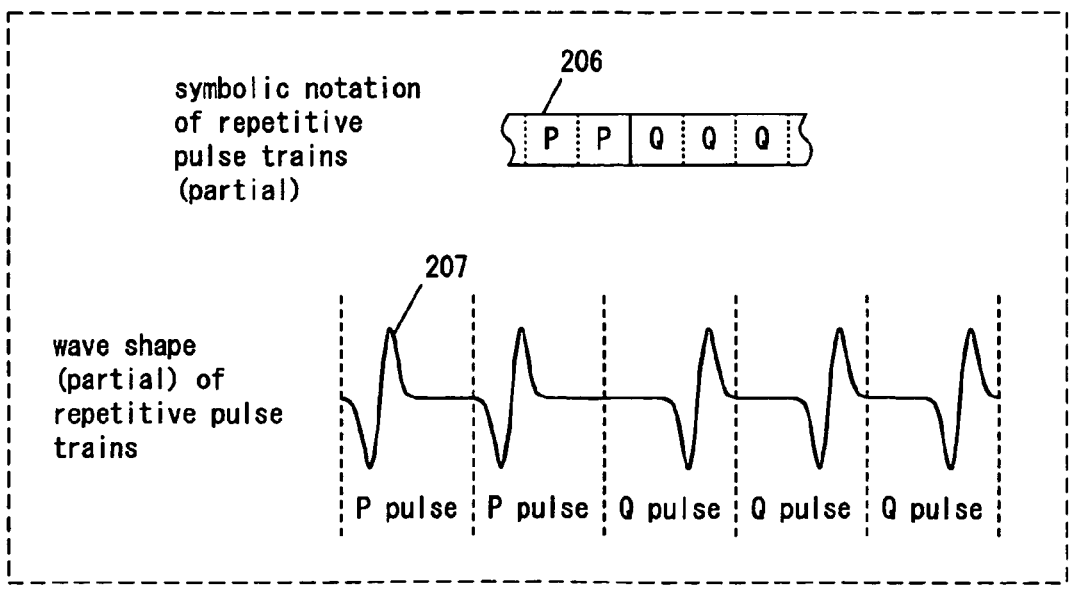
FIG. 11 is an illustration showing wave shapes in the repetitive pulse trains according to Embodiment 1 of the present invention.

FIG. 11 is an illustration showing wave shapes in the repetitive pulse trains according to Embodiment 1 of the present invention. The upper part of the FIG. 11 shows a symbolic notation 206 and the lower part of FIG. 11 shows the corresponding modulated wave shape 207, for a connection part of a pulse train composed of the P pulse 204 and a pulse train composed of the Q pulse 205. The modulated wave shape 207 of FIG. 11 is a pulse train by the pulse position modulation using either of the above-mentioned dipulse (the P pulse 204 and the Q pulse 205).

As explained above, the transmitting device of the present embodiment can perform transmitting of information by the UWB-IR method by encoding an information bit train from the information signal source 10 with the encoder 20, generating the modulated encoded pulse trains in the pulse generator 30, and transmitting the modulated encoded pulse trains from the antenna 90.

Embodiment 2

Figure 2:
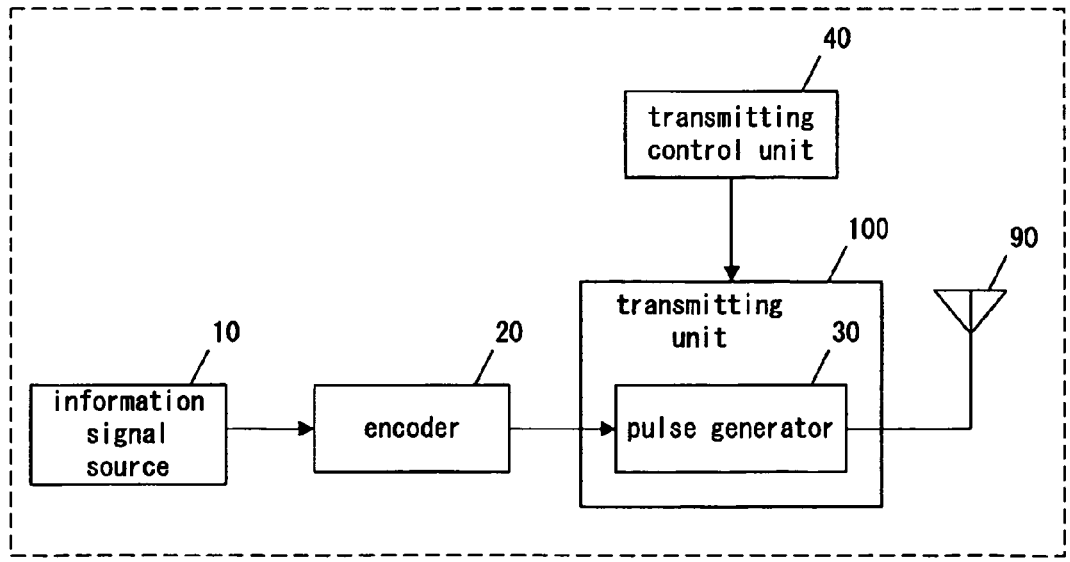
FIG. 2 is a block diagram of a transmitting device according to Embodiment 2 of the present invention.

FIG. 2 is a block diagram of a transmitting device according to Embodiment 2 of the present invention. In FIG. 2, description is omitted by giving the same symbols regarding the same components as in FIG. 1.

The transmitting device of the present embodiment as shown in FIG. 2 comprises an encoder 20, a transmitting unit 100, a transmitting control unit 40 and an antenna 90. The transmitting unit 100 includes a pulse generator 30. Compared with the transmitting device of Embodiment 1 of the present invention as shown in FIG. 1, the transmitting device of the present embodiment additionally comprises the transmitting control unit 40 operable to control the pulse generator 30.

The transmitting control unit 40 acquires communication path information transmitted from a receiving device, the information indicating a communication state of a communication path. The transmitting control unit 40 generates control information for controlling the pulse generator 30 based on the communication path information. According to the control information, the pulse generator 30 determines the number of repetitive pulses of the repetitive pulse train to be generated for every bit of the encoded bit train.

In the following, a case is explained where the communication path information transmitted from the receiving device includes error rates for a bit "1" and a bit "0" received by the receiving device. For example, when the error rate of the bit "1" is very close to a permissible value and the error rate of the bit "0" has a margin to the permissible value, the transmitting control unit 40 changes the control information in order to increase the number of pulses of the repetitive pulse train corresponding to the bit "1" and reduces the number of pulses of the repetitive pulse train corresponding to the bit "0". The pulse generator 30 changes the number of repetitive pulses of each repetitive pulse train according to the changed control information.

The transmitting control unit 40 transmits the number of repetitive pulses of the repetitive pulse trains, generated by the pulse generator 30, to the receiving device as pulse train information. This pulse train information may be transmitted to the receiving device by including in preamble pulses which are placed at the head of a series of repetitive pulse trains. When the transmitting control unit 40 changes periodically the number of repetitive pulses of the repetitive pulse trains to be generated by the pulse generator 30, only the pulse train information may be separately transmitted whenever the changes are made. The receiving device uses the pulse train information in decoding the received signal. In the case of five repetitive pulse trains 203 shown in FIG. 10, the numbers of repetitive pulses of the repetitive pulse trains 203 generated by the pulse generator 30 are "4", "4", "3", "3" and "4", and these numeric values are transmitted to the receiving device as the pulse train information.

Thus, the transmitting device of the present embodiment can control the number of repetitive pulses of repetitive pulse trains adaptively according to the communication state of the communication path.

Embodiment 3

Figure 3:
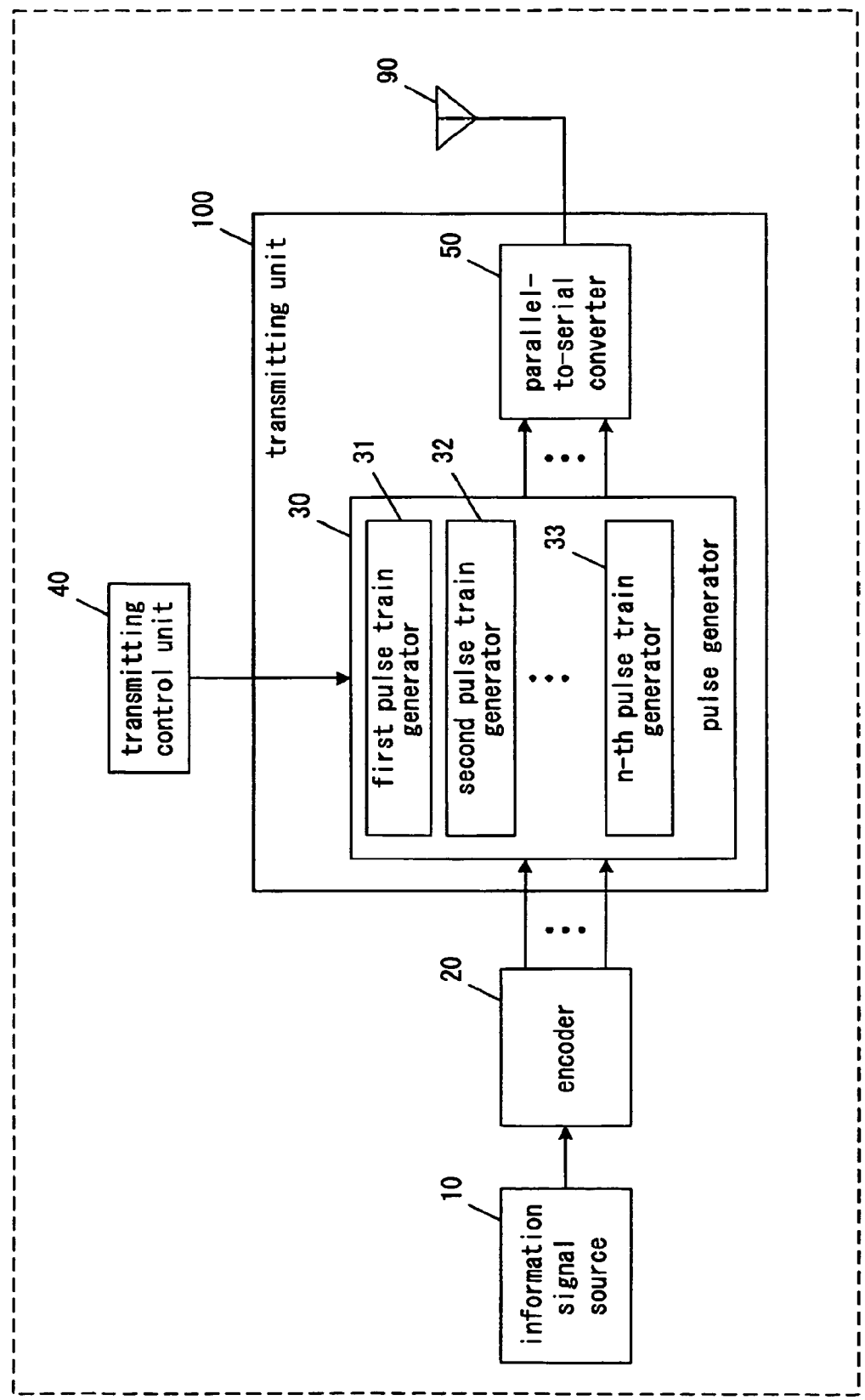
FIG. 3 is a block diagram of a transmitting device according to Embodiment 3 of the present invention.

FIG. 3 is a block diagram of a transmitting device according to Embodiment 3 of the present invention. In FIG. 3, explanation of components same as shown in FIG. 1 is omitted attaching same symbols as in FIG. 1.

The transmitting device of the present embodiment shown in FIG. 3 comprises an encoder 20, a transmitting unit 100, a transmitting control unit 40, and an antenna 90. The transmitting unit 100 comprises a pulse generator 30 and a parallel-to-serial converter 50. Furthermore, the pulse generator 30 comprises a first pulse train generator 31, a second pulse train generator 32, and an n-th pulse train generator 33.

A k-bit information bit train is inputted from an information signal source 10. The encoder 20 encodes the k-bit information bit train to an n-bit encoded bit train in parallel format at a coded rate (k/n), and then outputs the n-bit encoded bit train to the pulse generator 30 in parallel.

In the pulse generator 30, the first pulse train generator 31 generates a repetitive pulse train corresponding to the first bit of the n-bit encoded bit train, the second pulse train generator 32 generates a repetitive pulse train corresponding to the second bit of the n-bit encoded bit train, and similarly the n-th pulse train generator 33 generates a repetitive pulse train corresponding to the n-th bit of the n-bit encoded bit train. The first to n-th pulse train generators output the respective repetitive pulse trains in parallel. The repetitive pulse trains, which the first to n-th pulse train generators generate, are composed of the P pulse 204 and the Q pulse 205 based on pulse position modulation using the dipulse, according to the explanatory drawing of the repetitive pulse train generation in Embodiment 1 of the present invention, as shown in FIG. 10.

A number of repetitive pulses of the repetitive pulse trains, which the first to n-th pulse train generators individually generate, is controlled by control information that the transmitting control unit 40 outputs. In other words, the transmitting control unit 40 generates the control information based on the communication path information, sent by a receiving device, indicating the communication state of the communication path. The transmitting control unit 40 outputs the control information to the pulse generator 30. According to the control information, the first to n-th pulse train generators of the pulse generator 30 determine the number of repetitive pulses of the repetitive pulse trains to be generated.

The parallel-to-serial converter 50 converts the n-piece repetitive pulse trains, which the pulse generator 30 generates and outputs in parallel, into repetitive pulse trains in serial format, and then transmits sequentially the repetitive pulse trains from the antenna 90.

In addition, the transmitting control unit 40 transmits the number of repetitive pulses of the repetitive pulse trains, which the first pulse train generator 31 to the n-th pulse train generator 33 generate, to the receiving device as pulse train information. This pulse train information may be transmitted to the receiving device by including in preamble pulses which are placed at the head of a series of repetitive pulse trains. When the transmitting control unit 40 changes periodically the number of repetitive pulses of the repetitive pulse trains to be generated by the pulse generator 30, only the pulse train information may be separately transmitted whenever the changes are made. The receiving device uses the pulse train information in decoding the received signal.

As explained above, the transmitting method of the transmitting device according to the present embodiment acquires the communication path information of the communication path beforehand, and determines the each number of repetitive pulses of the n-piece repetitive pulse trains based on the acquired communication path information.

In the transmitting method of the transmitting device according to the present invention, the each number of repetitive pulses of n-piece repetitive pulse trains is transmitted as the pulse train information.

Thus, the transmitting device of the present embodiment can adaptively control the number of repetitive pulses of the repetitive pulse trains according to the communication state of the communication path, thereby transmitting information using the UWB-IR method.

Embodiment 4

Figure 4:
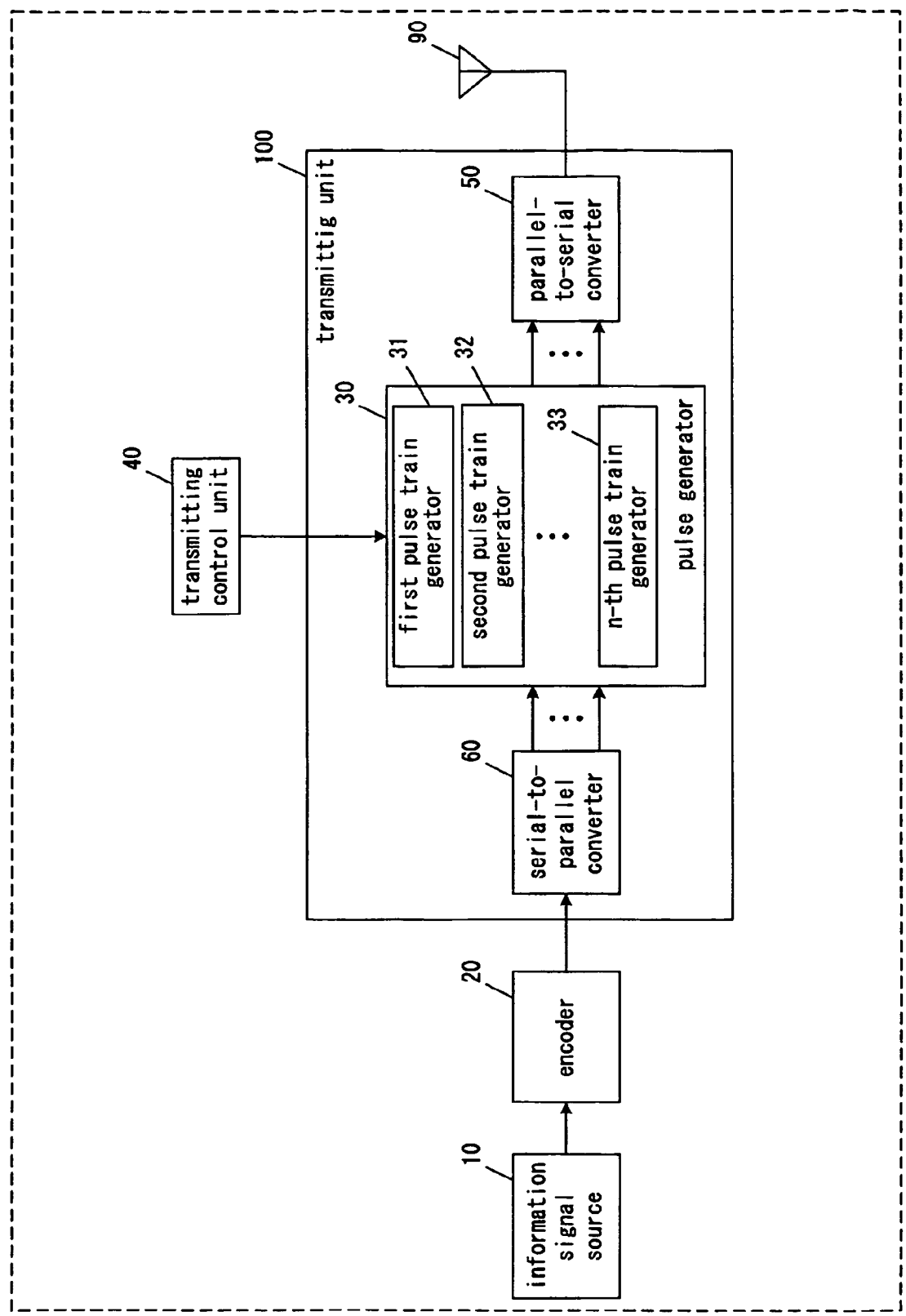
FIG. 4 is a block diagram of a transmitting device according to Embodiment 4 of the present invention.

FIG. 4 is a block diagram of a transmitting device according to Embodiment 4 of the present invention. In FIG. 4, explanation of components same as shown in FIG. 3 is omitted attaching same symbols as in FIG. 3.

In the transmitting device of the present embodiment shown in FIG. 4, a encoder 20 encodes a k-bit information bit train inputted from the information signal source 10 to an n-bit encoded bit train at a coded rate (k/n), then outputs the n-bit encoded bit train in serial format. In the transmitting device of the present embodiment, a transmitting unit 100 comprises a serial-to-parallel converter 60 operable to convert the n-bit encoded bit train in serial format that the encoder 20 has outputted into an n-bit encoded bit train in parallel format, a pulse generator 30 possessing a first pulse train generator 31 to an n-th pulse train generator 33 that is installed corresponding to the n-bit encoded bit train in parallel format, and a parallel-to-serial converter 50 operable to convert n-piece parallel repetitive pulse trains, which the pulse generator 30 outputs in parallel, into n-piece serial repetitive pulse trains.

Thus, in the transmitting device of the present embodiment, inside the transmitting unit 100, except for operation that the serial-to-parallel converter 60 converts the n-bit serial encoded bit train into the n-bit parallel encoded bit train, other operations of the present transmitting device are same as the transmitting device in Embodiment 3 of the present invention; therefore, further explanation is omitted.

In other words, in the transmitting method of the transmitting device according to the present embodiment, the n-bit encoded bit train is a parallel bit train, and the n-piece repetitive pulse trains are generated in parallel. After completion of parallel-to-serial conversion, the repetitive pulse trains are transmitted to the communication path one after another.

Thus, by using the encoder 20 that outputs the serial encoded bit train, the transmitting device of the present embodiment can transmit information using the UWB-IR method while adaptively controlling the number of repetitive pulses of the repetitive pulse trains according to the communication state of the communication path.

Embodiment 5

Figure 5:
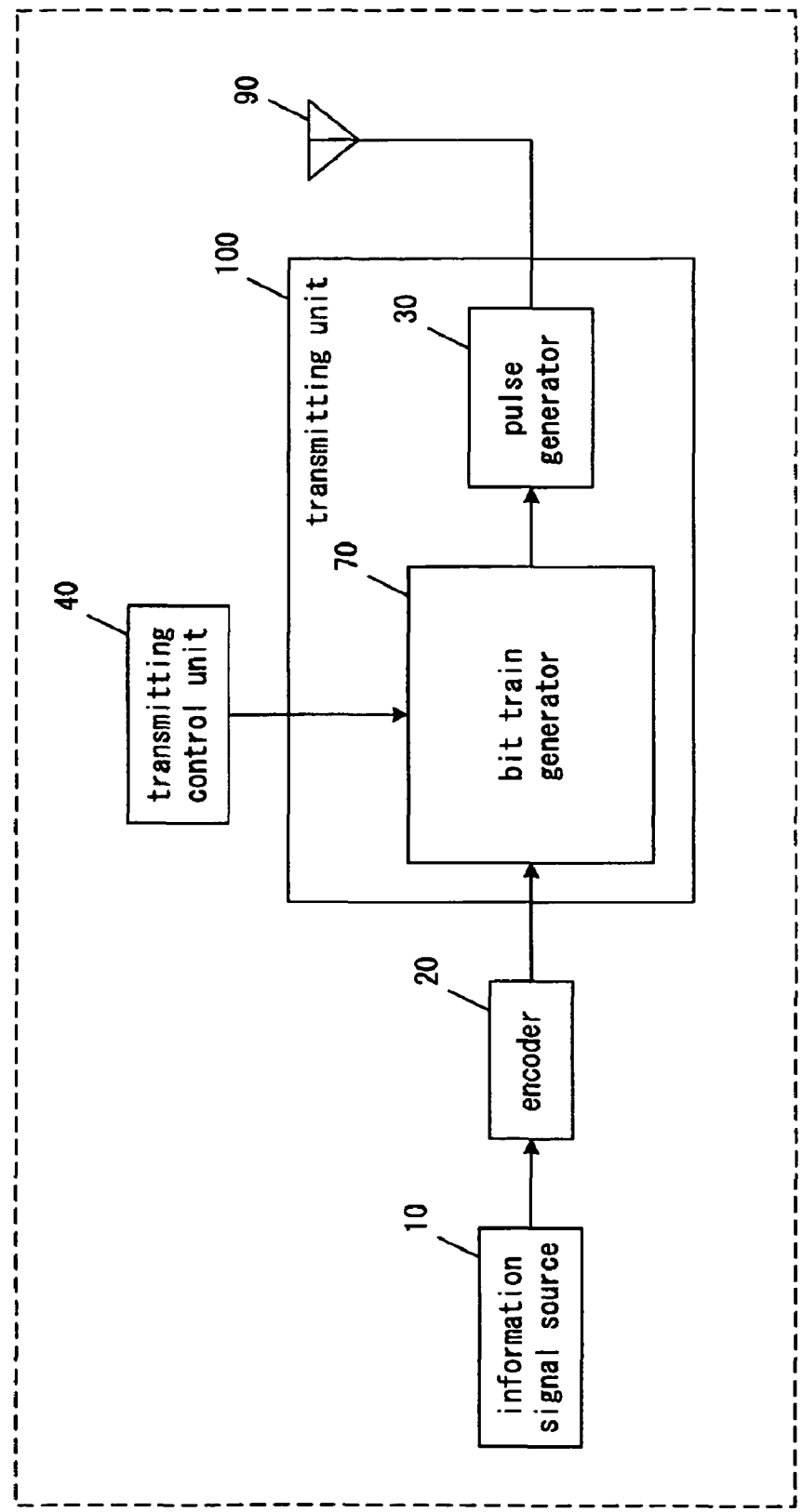
FIG. 5 is a block diagram of a transmitting device according to Embodiment 5 of the present invention.

FIG. 5 is a block diagram of a transmitting device according to Embodiment 5 of the present invention. In FIG. 5, explanation of components same as shown in FIG. 1 is omitted attaching same symbols as in FIG. 1.

The transmitting device of the present embodiment shown in FIG. 5 comprises an encoder 20, a transmitting unit 100, a transmitting control unit 40, and an antenna 90. The transmitting unit 100 possesses a bit train generator 70 and a pulse generator 30.

Hereafter, operation of the transmitting device of the present embodiment is explained.

A k-bit information bit train, inputted from an information signal source 10, is encoded to an n-bit encoded bit train by the encoder 20 at an encoded rate (k/n). The n-bit encoded bit train is inputted into the bit train generator 70.

The bit train generator 70 generates n-piece repetitive bit trains, wherein the same bit is repeated for plural times for each bit of the n-bit encoded bit train that is inputted.

At this time, the transmitting control unit 40 outputs the generated control information to the bit train generator 70 based on the communication path information sent from a receiving device. According to the control information, the bit train generator 70 determines each number of the repetitive bits for the n-piece repetitive bit trains to be generated. However, the total number of bits is maintained to be constant.

The pulse generator 30 converts each bit of the n-piece repetitive bit trains generated by the bit train generator 70 to an n-piece repetitive pulse trains, composed by one of the predetermined pulses depending on the kind of the bit (that is, depending on a case that the bit is either "0" or "1"). Thereafter, the pulse generator 30 transmits the n-piece repetitive pulse trains from the antenna 90 one after another.

Figure 12:
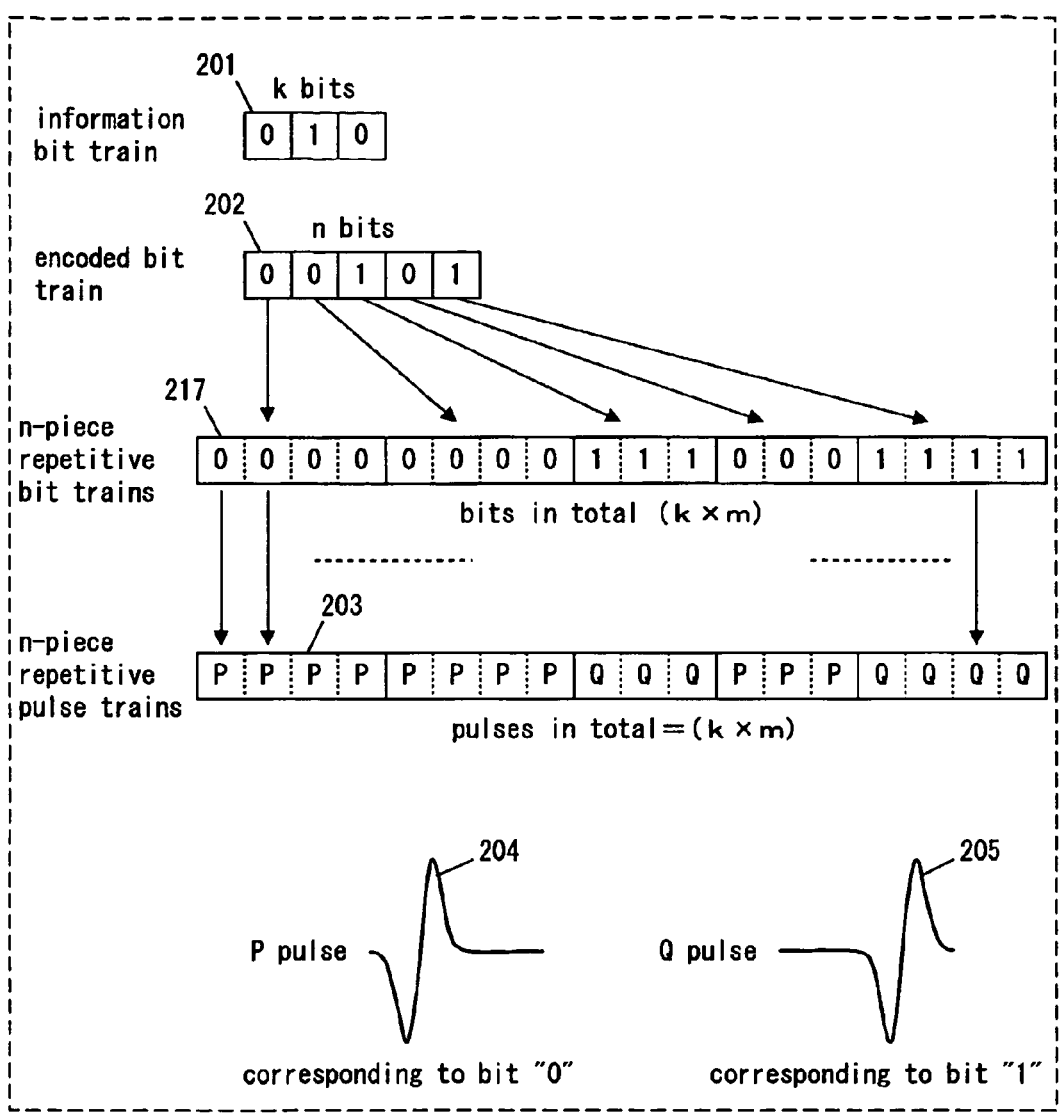
FIG. 12 is an explanatory drawing for generating repetitive bit trains according to Embodiment 5 of the present invention.

FIG. 12 is an explanatory drawing for generating repetitive bit trains according to Embodiment 5 of the present. In FIG. 12, an information bit train "010" 201 of k-bit (k=3 in the present example) is encoded to an encoded bit train "00101" 202 of n-bit (n=5 in the present example). Five pieces of repetitive bit trains 217 are generated for the encoded bit train 202, where the same bit is repeated for plural times in each piece of the repetitive bit trains.

In other words, a repetitive bit train "0000" is generated for the first bit "0" of the encoded bit train 202. A repetitive bit train "0000" is generated for the second bit "0" of the encoded bit train 202. A repetitive bit train "111 " is generated for the third bit "1" of the encoded bit train 202. A repetitive bit train "000" is generated for the fourth bit "0" of the encoded bit train 202. Furthermore, a repetitive bit train "1111" is generated for the fifth bit "1" of the encoded bit train 202.

The number of repeating the same bit, that is the number of repetitive bits of each repetitive bit train, is controlled by the control information that is outputted by the transmitting control unit 40. In other words, according to the control information, the bit train generator 70 determines the number of repetitive bits of each bit train for the five pieces of repetitive bit rains 217 to be generated, under the condition that the total number of bits is constant.

The pulse generator 30 converts each bit of the five pieces of repetitive bit trains 217, which have been generated in the above-mentioned manner, to a modulated pulse.

In the explanatory drawing shown in FIG. 12, similar to the transmitting device of Embodiment 1 of the present invention shown in FIG. 10, the transmitting device of the present embodiment uses a P pulse 204 corresponding to a bit "0" and a Q pulse 205 corresponding to a bit "1" as the modulated pulse.

In other words, the pulse generator 30 converts the bit "0" within the five pieces of repetitive bit trains to the P pulse 204 and the bit "1" to the Q pulse 205; thereby, generating five pieces of repetitive pulse trains 203. The pulse generator 30 then transmits the five pieces of repetitive pulse trains 203 from the antenna 90 one after another.

In addition, the transmitting control unit 40 transmits each number of repetitive bits of the repetitive bit trains 217, which the bit train generator 70 generates, to the receiving device. In the example of FIG. 12, the bit train information is the number of repetitive bit "4", "4", "3", "3", "4" of the five pieces of repetitive bit trains.

The bit train information in the present embodiment corresponds to the pulse train information in Embodiments 1 to 4 of the present invention as clearly shown in comparison between FIG. 10 and FIG. 12. In other words, both items of the information show the number of repetitive pulses of the n-piece repetitive pulse trains that is transmitted from the transmitting device.

The bit train information may be transmitted to the receiving device by including in preamble pulses which are placed at the head of a series of repetitive bit trains. When the transmitting control unit 40 changes periodically the number of repetitive bits of the repetitive bit trains to be generated by the bit train generator 70, only the bit train information may be separately transmitted whenever the changes are made.

In addition, the transmitting method in the transmitting device of the present embodiment acquires the communication path information of the communication path beforehand, and determines each number of repetitive bits of the n-piece repetitive bit trains based on the acquired communication path information. Furthermore, the number of repetitive bits of the n-piece repetitive bit trains is transmitted as the bit train information.

As mentioned above, according to the present embodiment, it is possible to realize the transmitting device using the UWB-IR method, which can adaptively adjust the number of repetitive pulses of the repetitive pulse trains according to the communication state of the communication path. In addition, according to the transmitting device of the present embodiment, all of the processing up to generating the n-piece repetitive bit trains can be realized in digital processing.

Embodiment 6

Figure 6:
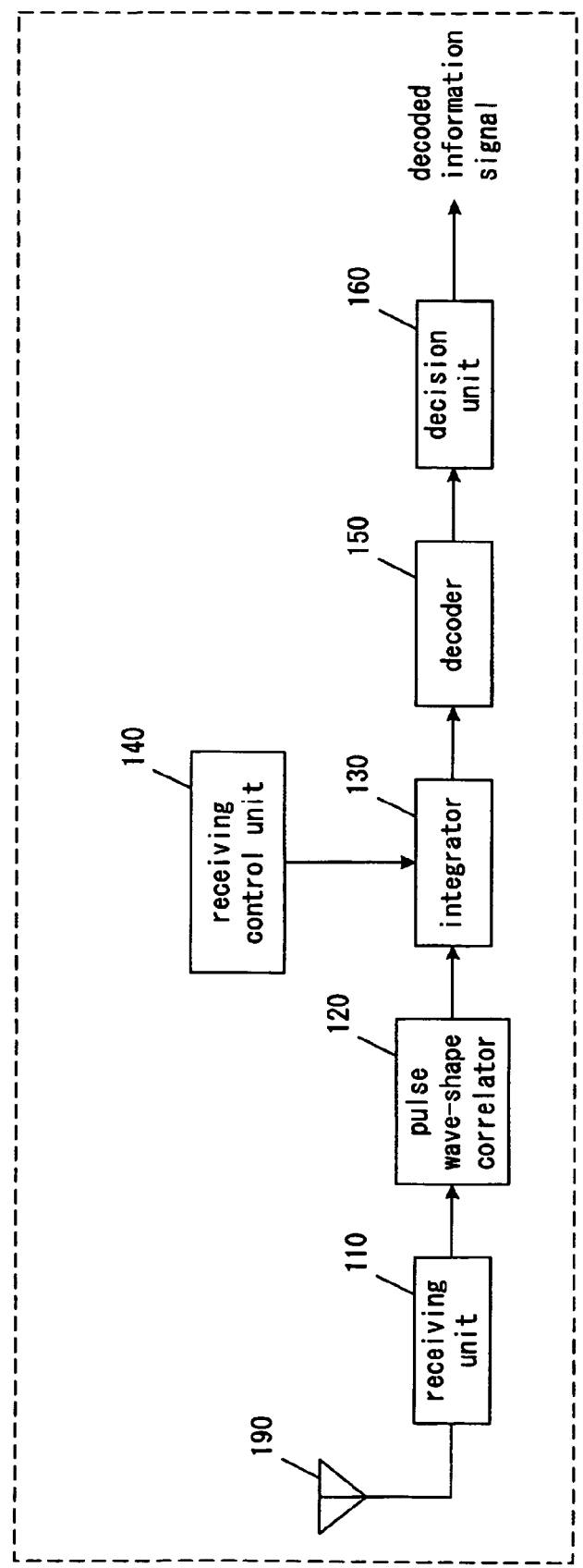
FIG. 6 is a block diagram of a receiving device according to Embodiment 6 of the present invention.

FIG. 6 is a block diagram of a receiving device according to Embodiment 6 of the present invention. The receiving device of the present embodiment comprises an antenna 190, a receiving unit 110, a pulse wave-shape correlator 120, an integrator 130, a receiving control unit 140, a decoder 150, and a decision unit 160.

Referring to FIG. 6, operation of the receiving device of the present embodiment is explained.

The receiving unit 110 receives as n-piece received pulse trains, via the antenna 190, n-piece pulse trains that have been transmitted by either one of the transmitting devices mentioned in Embodiments 1 to 5 of the present invention using the UWB-IR method The pulse wave-shape correlator 120 correlates each pulse of the n-piece received pulse trains, which the receiving unit 110 has received, with a template wave shape that is set up beforehand. The operation is explained referring to FIG. 13.

Figure 13A:
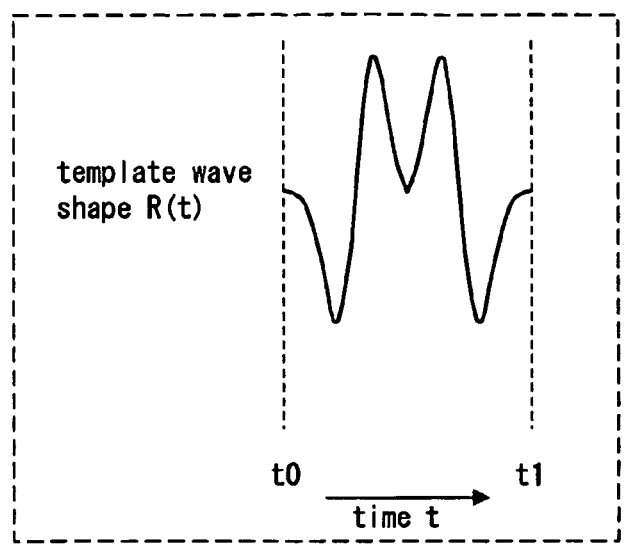
FIG. 13(*a*) is an illustration showing a template wave shape according to Embodiment 6 of the present invention.
Figure 13B:
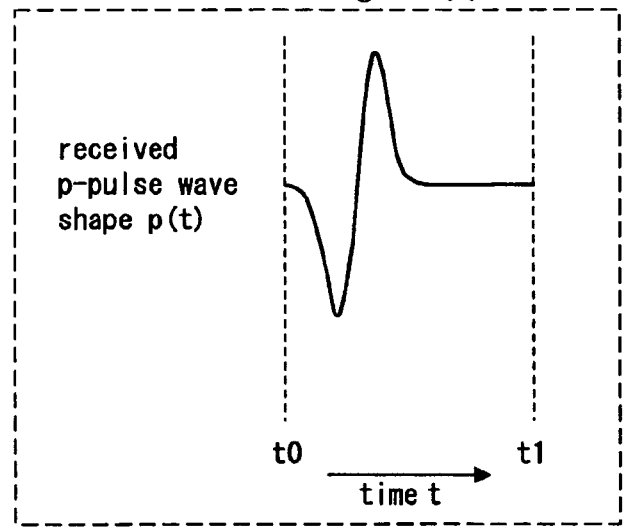
Figure 13C:
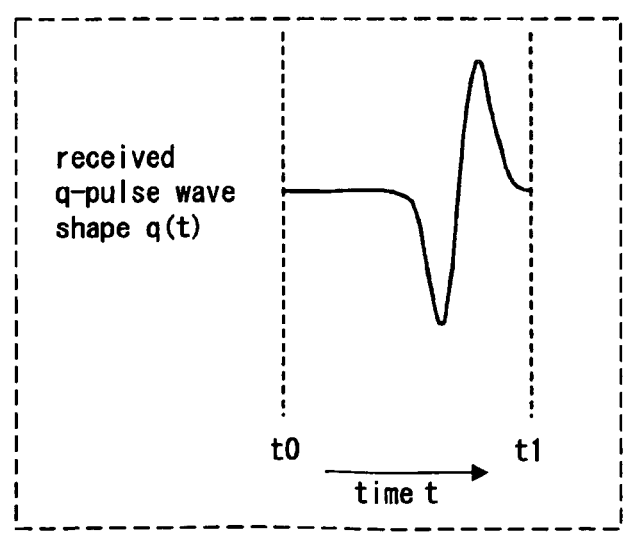

FIG. 13($a$) is an illustration showing a template wave shape according to Embodiment 6 of the present invention. FIG. 13($b$) is an illustration showing a received p-pulse wave shape according to Embodiment 6 of the present invention. FIG. 13($c$) is an illustration showing a received q-pulse wave shape according to Embodiment 6 of the present invention.

The received p pulse p(t) of FIG. 13($b$) and the received q-pulse q(t) of FIG. 13($c$) are received pulses that compose the n-piece received pulse trains, which the receiving unit 110 has received. The received p-pulse p(t) is a pulse that the receiving unit 110 has received the P pulse 204 corresponding to the encoded bit "0" shown in FIG. 10. Similarly, the received q-pulse q(t) is a pulse that the receiving unit 110 has received the Q pulse 205 corresponding to the encoded bit "1".

The template wave shape R(t) of FIG. 13(a) is a wave shape that is created based on an ideal received p-pulse pθ(t) and an ideal received q-pulse qθ(t), which are assumed to be received in a state where there is no extraneous noise pickup in the communication path. The template wave shape R(t) is defined by (Formula 1).

$$R(t)=/H)(O-q\theta(t)$$ (Formula 1)

The pulse wave-shape correlator 120 of FIG. 6 calculates a correlation value mp for each received pulse V (t) of the n-piece received pulse trains which the receiving unit 110 has received, correlating with the template wave shape R (t) using in the following formula.

$$mp = \int_{t0}^{t1} R\{f\}V\{t\}dt$$ (Formula 2)

In (Formula 2), the lower limit t0 and the upper limit t1 of the integral interval define a time interval, generally called as a frame length, where one piece of received pulse V(t) of the received pulse train exists.

As it can be easily presumed from the location relationship on the time axis between the template wave shape R (t) shown in FIG. 13 and the received p-pulse wave shape p (t) or the received q-pulse wave shape q(t), when the received pulse V(t) is the received p-pulse p(t), the correlation value mp calculated by (Formula 2) possesses a plus value, and when the received pulse V(t) is the received q-pulse q(t), the correlation value mp calculated by (Formula 2) possesses a minus value.

Referring to FIG. 6 again, based on the pulse train information or the bit train information sent beforehand from either one of the transmitting devices of the Embodiments 1 to 5 of the present invention, the receiving control unit 140 determines the number of repetitive pulses of the n-piece received pulse trains which the receiving unit 110 has received, and outputs the number of repetitive pulses to the integrator 130.

The integrator 130 integrates the correlation values for the pulses of the n-piece received pulse trains as many as the number of repetitive pulses of the n-bit received pulse trains and outputs n-piece integrated values. As described above, the correlation values are calculated by the pulse wave-shape correlator 120 according to (Formula 2), and the number of repetitive pulses is determined by the receiving control unit 140. As a resultant effect of the integration, even when the received pulse V(t) includes a lot of noises, the received pulse V(t) can be identified more clearly whether it is the received p-pulse or the received, q-pulse.

The decoder 150 makes soft decision for the n-piece received pulse trains based on the n-piece integrated values which the integrator 130 has outputted, and outputs an n-bit soft decision result.

The decision unit 160 makes hard decision for the n-piece received pulse trains, which is the final decoding processing, based on the n-bit soft decision result that the decoder 150 has outputted, and outputs a k-bit information bit train as a decoded information signal.

Figure 14:
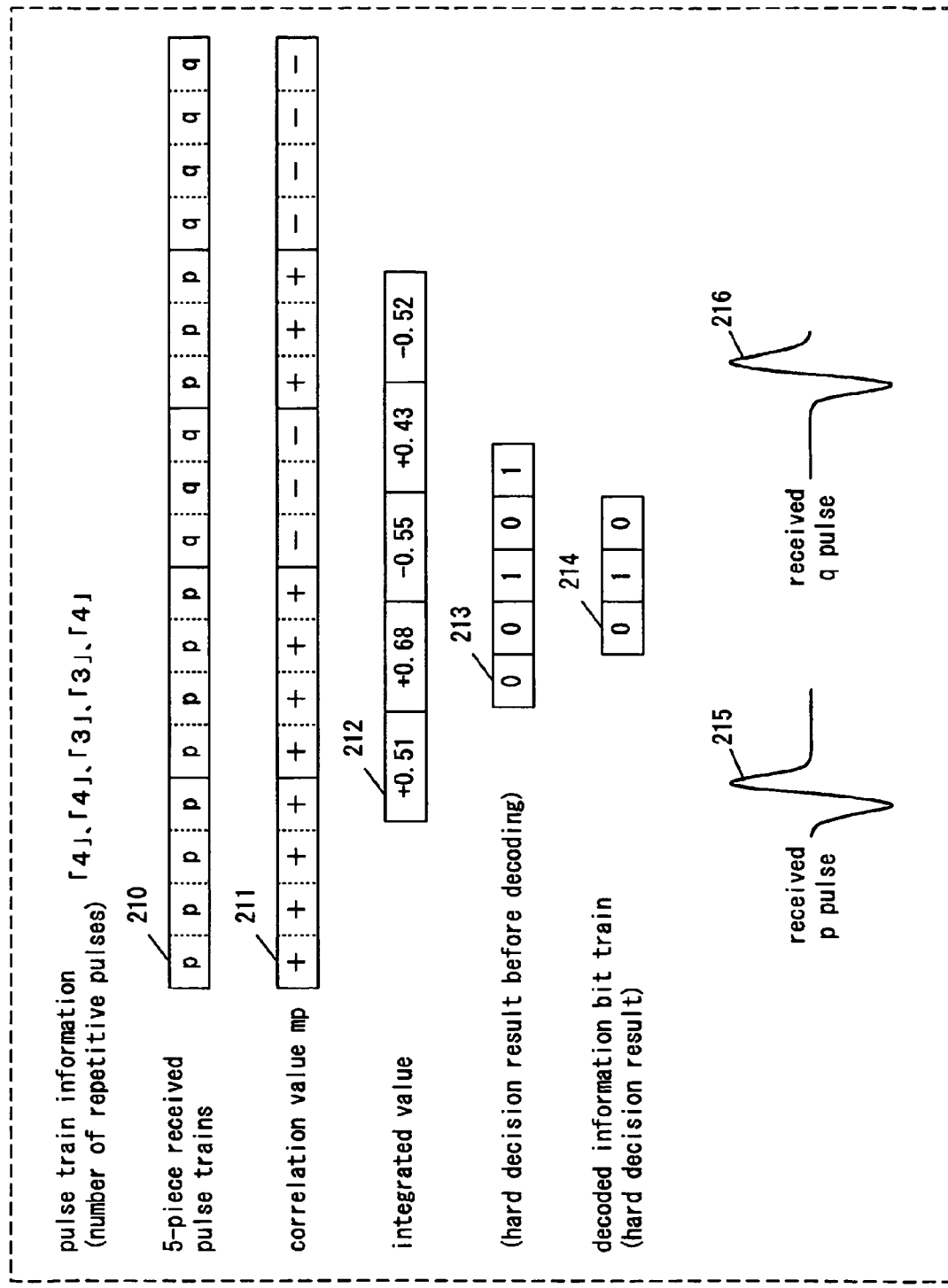
FIG. 14 is an explanatory drawing of signal processing in the receiving device according to Embodiment 6 of the present invention.

FIG. 14 is an explanatory drawing of signal processing in the receiving device according to Embodiment 6 of the present invention. The figure shows a state where the receiving device of the present embodiment shown in FIG. 6 receives the five pieces of the repetitive pulse trains 203, as shown in FIG. 10, as the received pulse trains 210 via the communication path. ("p" shows the received p-pulse 215, and "q" shows the received q-pulse 215.)

The receiving control unit 140 receives the pulse train information beforehand, and notifies the integrator 130 that the received pulse trains are composed of five pieces of pulse trains, each pulse train having the number of repetitive pulses; "4", "4", "3", "3", and "4.".

The pulse wave-shape correlator 120 calculates a correlation value mp 211 for each received pulse of the five pieces of received pulse trains 210 with the template wave shape according to (Formula 2). Since the calculation result of the correlation value mp 211 is not necessarily an integer, the calculated results are shown by only signs of "+" and "−" of the value in FIG. 14.

The integrator 130 integrates the correlation value mp 211 as many as the number of the repetitive pulses of each pulse train, using the pulse train information that is notified by the receiving control unit 140. After integration, the integrator 130 outputs five pieces of integrated values 212. As illustrated in FIG. 14, the integrated value 212 is not necessarily an integer.

The decoder 150 makes soft decision for the five pieces of integrated values 212, and outputs a soft decision result of 5 bits. (The soft decision result is not necessarily an integer, either.)

The decision unit 160 makes hard decision before decoding with a hard decision result "00101" 213, based on the soft decision result of 5 bits. Then the decision unit 160 decodes the hard decision result and acquires an information bit train "010" 214. The hard decision result "00101" 213 before decoding is not necessarily explicitly outputted as one processing result, it is described explicitly just for explanation in the present description in FIG. 14.

Thus, the receiving device of the present embodiment can receives n-piece pulse trains as n-piece received pulse trains and decode the n-piece received pulse trains to obtain a k-bit information bit train. The n-piece pulse trains received by the receiving device is ones that either one of the transmitting devices described in Embodiment 1 to 5 of the present invention has encoded a k-bit information pulse train and transmitted the encoded result in correspondence with UWB-IR method.

Embodiment 7

Figure 7:
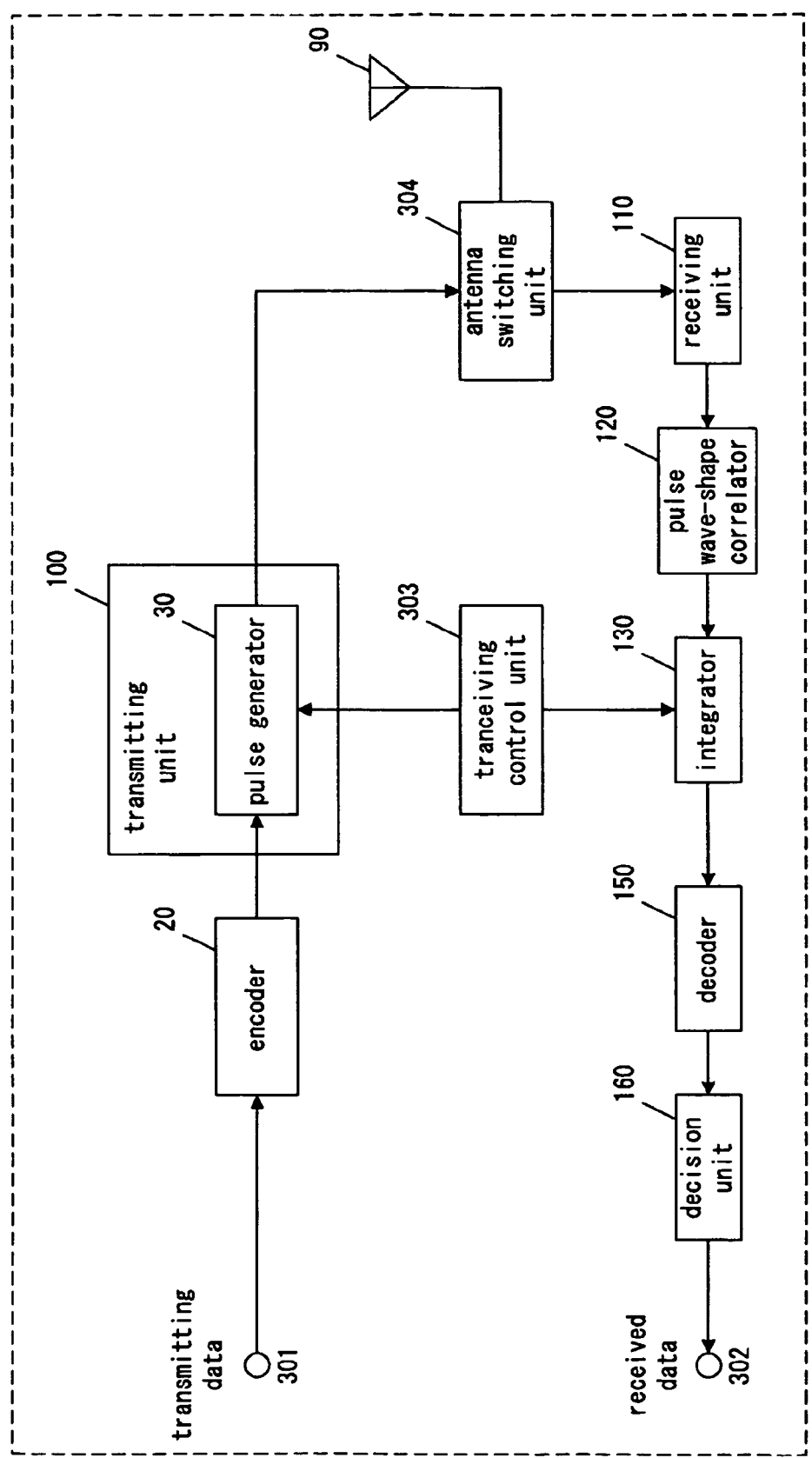
FIG. 7 is a block diagram of a transceiving device according to Embodiment 7 of the present invention.

FIG. 7 is a block diagram of a transceiving device according to Embodiment 7 of the present invention. The transceiving device of the present embodiment is made by unifying the transmitting device in Embodiment 2 of the present invention shown in FIG. 2 and the receiving device in Embodiment 6 of the present invention shown in FIG. 6. Therefore, in FIG. 7, explanation of components same as shown in FIGS. 2 and 6 is omitted attaching same symbols as in FIGS. 2 and 6.

The transceiving device of the present embodiment comprises an encoder 20, a transmitting unit 100 possessing a pulse generator 30, a receiving unit 110, a pulse wave-shape correlator 120, an integrator 130, a decoder 150, a decision unit 160, a tranceiving control unit 303, an antenna switching unit 304, and an antenna 90.

The operation of the transceiving device of the present embodiment in a transmitting mode is basically same as the operation of the transmitting device in Embodiment 2 of the present invention shown in FIG. 2.

An information bit train, which is inputted from an input terminal 301 as transmitting data, is encoded into an encoded bit train by the encoder 20. The encoded bit train is converted into repetitive pulse trains by the pulse generator 30, and then transmitted to a partner's receiver from the antenna 90 after passing through the antenna switching unit 304. Moreover, the number of repetitive pulses in each of the repetitive pulse trains generated by the pulse generator 30 is controlled by the tranceiving control unit 303 based on the communication path information. The contents of the control are transmitted to the partner's receiver as pulse train information.

In addition, in the transceiving device of the present embodiment, a transmitting control unit, which composes a part of the tranceiving control unit 303, acquires the communication path information regarding the communication path, and generates transmitting control information based on the acquired communication path information.

Furthermore, in the transceiving device of the present embodiment, the transmitting unit 100 possesses the pulse generator 30. The pulse generator 30 generates n-piece repetitive pulse trains for the n-bit encoded bit trains which the encoder 20 has encoded. In generating the n-piece repetitive pulse trains, the pulse generator 30 generates a pulse, which is predetermined depending on the kind of a bit, repetitively for plural times for each bit of the n-bit encoded bit trains, according to the transmitting control information that the transmitting control unit has generated.

Under the present situation, in the transceiving device of the present embodiment, the transmitting control unit, comprising a part of the tranceiving control unit 303, transmits, as the pulse train information, the number of repetitive pulses of the n-piece repetitive pulse trains that the pulse generator 30 generates.

The transceiving device of the present embodiment may alternatively be constructed as follows: The transceiving device comprises an encoder operable to output an n-bit encoded bit train as an n-bit parallel format encoded bit train; and a transmitting unit including a pulse generator and a parallel-to-serial converter. The pulse generator is operable to repetitively generate a plurality of pulses for each encoded bit of the n-bit parallel format encoded bit train outputted by the encoder, thereby outputting n-piece parallel format repetitive pulse trains, the plurality of pulses being predetermined according to the kind of each encoded bit. The parallel-to-serial converter is operable to convert the n-piece parallel format repetitive pulse trains outputted by the pulse generator to n-piece serial format repetitive pulse trains, thereby sequentially transmitting the n-piece serial format repetitive pulse trains to the communication path.

At this time, the pulse generator determines, in accordance with the control information generated by the transmitting control unit described above, the number of each repetitive pulses composing the n-piece repetitive pulse trains, in such a manner that pulses included in the n-piece repetitive pulse trains amount to (k*m) pieces in total, and at least two pieces of the n-piece repetitive pulse trains are composed of repetitive pulses of different numbers.

Another alternative to the transceiving device of the present embodiment may be constructed as follows: The transceiving device comprises an encoder operable to output an n-bit encoded bit train as an n-bit serial format encoded bit train; and a transmitting unit including a serial-to-parallel converter, a pulse generator, and a parallel-to-serial converter. The serial-to-parallel converter is operable to convert the n-bit serial format encoded bit train outputted by the encoder to an n-bit parallel format encoded bit train. The pulse generator is operable to repetitively generate a plurality of pulses for each encoded bit of the n-bit parallel format encoded bit train outputted by the encoder, thereby outputting n-piece parallel format repetitive pulse trains, the plurality of pulses being predetermined according to the kind of each encoded bit. The parallel-to-serial converter is operable to convert the n-piece parallel format repetitive pulse trains outputted by the pulse generator to n-piece serial format repetitive pulse trains, thereby sequentially transmitting the n-piece serial format repetitive pulse trains to the communication path.

At this time, the pulse generator determines, in accordance with the control information generated by the above-described transmitting control unit, the number of each repetitive pulses composing the n-piece repetitive pulse trains, in such a manner that pulses included in the n-piece repetitive pulse trains amount to (k*m) pieces in total, and at least two pieces of the n-piece repetitive pulse trains are composed of repetitive pulses of different numbers.

An alternative to the transmitting unit 100 in the transceiving device of the present embodiment may be constructed as follows: The transmitting unit comprises a bit train generator and a pulse generator. The bit train generator is operable to repeat, for a plurality of times, each bit of the n-bit encoded bit train encoded by the encoder to generate n-piece repetitive bit trains. The pulse generator is operable to generate a pulse for each bit of the n-piece repetitive bit trains generated by the bit train generator, the pulse being predetermined according to the kind of each bit, thereby transmitting the generated pulse to the communication path.

At this time, the bit train generator determines, in accordance with the control information generated by the above-described transmitting control unit, the number of each repetitive bits composing the n-piece repetitive bit trains, in such a manner that bits included in the n-piece repetitive bit trains amount to (k*m) pieces in total, and at least two pieces of the n-piece repetitive bit trains are composed of repetitive bits of different numbers. The transmitting control unit transmits, as the bit train information, the number of repetitive bits of the n-piece repetitive bits trains that the bit train generator generates.

The operation of the transceiving device of the present embodiment in a receiving mode is basically same as the operation of the receiving device in Embodiment 6 of the present invention shown in FIG. 6.

The receiving unit 110 performs receiving process for received pulse trains received by the antenna 90 and fed by the antenna switching unit 304. The pulse wave-shape correlator 120 correlates each pulse of the received pulse trains and the template wave shape. The integrator 130 integrates the acquired correlation value. The decoder 150 makes soft decision for the correlation value; the decision unit 160 makes hard decision for the soft decision result; and outputs the decoded information bit train to an output terminal 302 as received data. The interval over which the integrator 130 integrates the correlation value (that is, the number of repetitive pulses of each repetitive pulse train) is controlled by the tranceiving control unit 303 based on the pulse train information that is sent from a partner's transmitter beforehand.

A transceiving method adopted by the transceiving device of the present embodiment comprises: assuming that m-piece pulses are transmitted per one bit of information bits ("m" is a natural number not less than 2), and that a coded rate is (k/n) ("k" is a natural number not less than 1, and "n" is a natural number not less than 2), transforming a k-bit information bit train to (k*m)-piece transmit repetitive pulses in total, and transmitting sequentially the (k*m)-piece transmit repetitive pulses to a communication partner via the communication path. In this case the (k*m)-piece transmit repetitive pulses are composed of n-pieces transmit repetitive pulse trains, and at least two pieces of the n-piece transmit repetitive pulse trains possess lengths different from each other.

The transceiving method further comprises: receiving as n-piece received pulse trains n-piece repetitive pulse trains transmitted by the communication partner via the communication path; outputting number of repetitive pulses composing each of the n-piece received pulse trains, based on pulse train information or bit train information received beforehand; correlating individually pulses composing the n-piece received pulse trains with a predetermined template wave shape, thereby outputting correlation values; integrating the correlation values as many as the number of repetitive pulses, thereby providing n-piece integrated values; making soft decision for the n-piece received pulse trains based on the n-piece integrated values, thereby outputting the soft decision results for n bits; and making hard decision in decoding for the n-piece received pulse trains based on the soft decision results for n bits, thereby outputting the k-bit information bit train as a decoded information signal.

Furthermore, in the transceiving method adopted by the transceiving device of the present invention, it is also desirable to configure that the n-piece transmit repetitive pulse trains correspond to the n-bit encoded bit train which the k-bit information bit train is encoded at the coded rate (k/n). Each repetitive pulse train of the n-piece transmit repetitive pulse trains are constructed by generating a pulse repetitively for plural times corresponding to each bit of the n-bit encoded bit train. The pulse is determined beforehand depending on the kind of a bit.

In this case, the transceiving method, adopted by the transceiving device of the present embodiment, transmits the number of repetitive pulses of the n-piece transmit repetitive pulse trains as the pulse train information.

It is also alternatively desirable, in the transceiving method adopted by the transceiving device of the present invention, to configure that each pulse of the transmit repetitive pulses is generated by using a pulse predetermined depending on the kind of a bit, corresponding to each bit of the n-piece transmit repetitive bit trains which include at least two repetitive bit trains with different lengths from each other, and that the n-piece transmit repetitive bit trains correspond to the n-bit encoded bit train which the k-bit information bit train is encoded at the coded rate (k/n) and each repetitive bit train of the n-piece transmit repetitive bit trains is generated by repeating each bit of the n-bit encoded bit trains for plural times.

In this case, the transceiving method, adopted by the transceiving device of the present embodiment, transmits the number of repetitive bits of the n-piece transmit repetitive bit trains as the bit train information.

As explained above, according to the present embodiment, it is possible to provide the transceiving device using the UWB-IR method, which can adjust adaptively the number of the repetitive pulses to be generated for the encoded bit.

Embodiment 8

Figure 8:
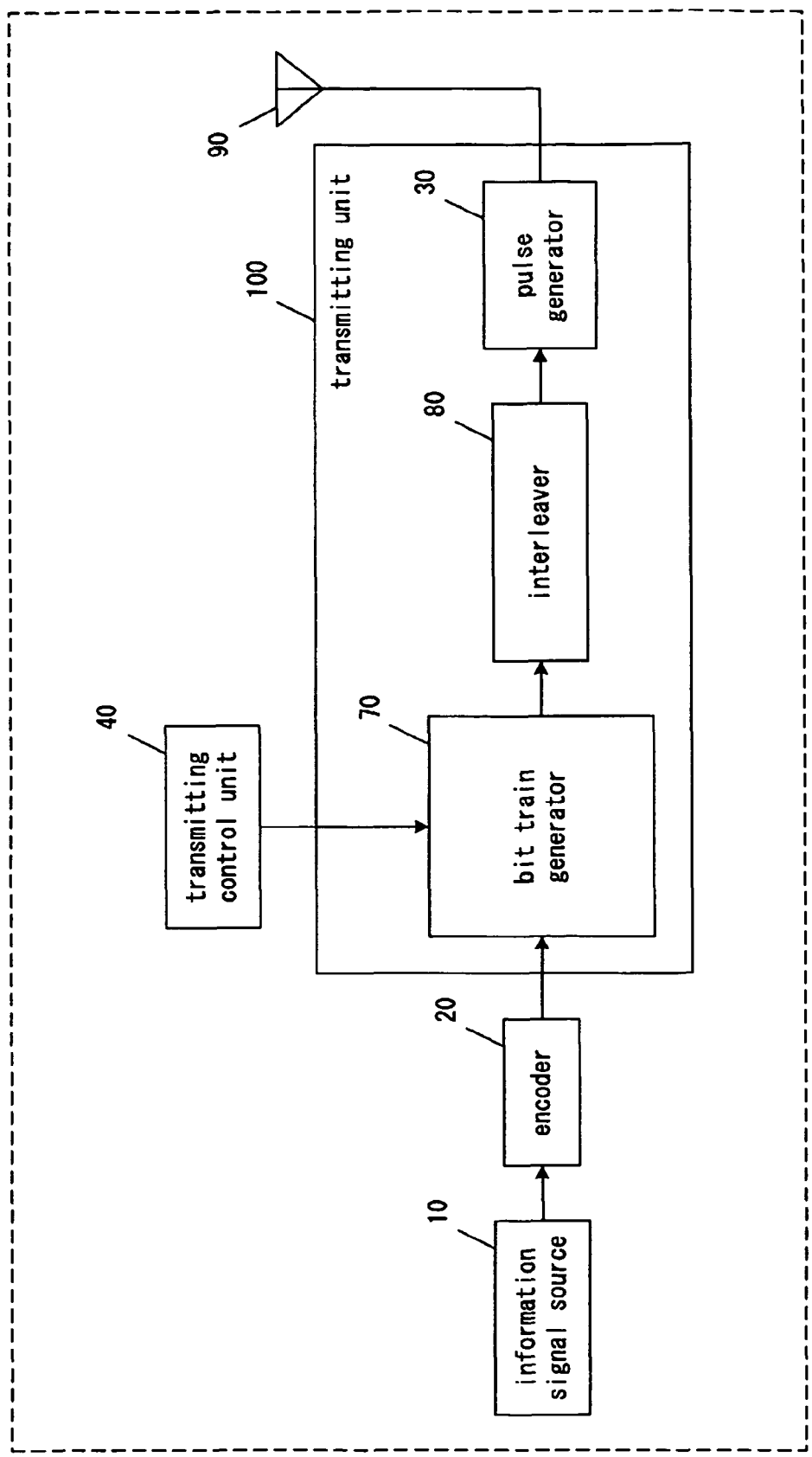
FIG. 8 is a block diagram of a transmitting device according to Embodiment 8 of the present invention.

FIG. 8 is a block diagram of a transmitting device according to Embodiment 8 of the present invention.

In FIG. 8, explanation of components same as shown in FIG. 5 is omitted attaching same symbols as in FIG. 5.

As shown in FIG. 8, on condition that m-piece pulses are transmitted per one bit of information bits ("m" is a natural number not less than 2) and a coded rate is (k/n) ("k" is a natural number not less than 1, and "n" is a natural number not less than 2), the transmitting device of the present embodiment comprises an encoder 20, a transmitting unit 100, a transmitting control unit 40, and an antenna 90.

The encoder 20 is operable to encode a k-bit information bit train to an n-bit encoded bit train at a coded rate of (k/n).

The transmitting unit 100 comprises a bit train generator 70, an interleaver 80, and a pulse generator 30. The bit train generator 70 is operable to output, as a first time-series bit train, the n-piece repetitive bit trains generated by repeating each bit for plural times for the n-bit encoded bit train encoded by the encoder 20. The interleaver 80 is operable to change time-based location of each bit of the first time-series bit train outputted by the bit train generator 70, thereby outputting a second time-series bit train. The pulse generator 30 is operable to generate a pulse, predetermined for the kind of a bit, for each bit of the second time-series bit train outputted by the interleaver 80, thereby transmitting the generated second time-series pulse train to the communication path one after another.

The transmitting control unit 40 is operable to acquire the communication path information regarding the communication path, to determine the number of repetitive bits of the n-piece repetitive bit trains generated by the bit train generator 70 based on the acquired communication path information, and to transmit the determined number of repetitive bits as the bit train information.

The transmitting control unit 40 determines the number of repetitive bits of the n-piece repetitive bit trains to be generated by the bit train generator 70, in such a manner that bits included in the n-piece repetitive bit trains amount to (k*m) pieces in total, and at least two pieces of the n-piece repetitive bit trains are composed of repetitive bits of different number.

In the transmitting device of the present embodiment, the interleaver 80 is newly added between the bit train generator 70 and the pulse generator 30, compared with the transmitting device of Embodiment 5 of the present invention shown in FIG. 5. However, the operation of the transmitting device of the present embodiment is same as the corresponding operation of the transmitting device of Embodiment 5 of the present invention except for operation related to the interleaver 80.

In the transmitting device of the present embodiment, the interleaver 80 changes the time-based locations of bits (the first time-series) of the n-piece repetitive bit trains generated by the bit train generator 70, and creates a bit train of new time-based locations of bits (the second time-series). The pulse generator 30 converts each bit of the second time-series bit train created by the interleaver 80 into a pulse that is predetermined depending on the kind of the bit, and transmits the pulse from the antenna 90. Therefore, the second time-series pulse train is transmitted from the antenna 90.

Figure 9:
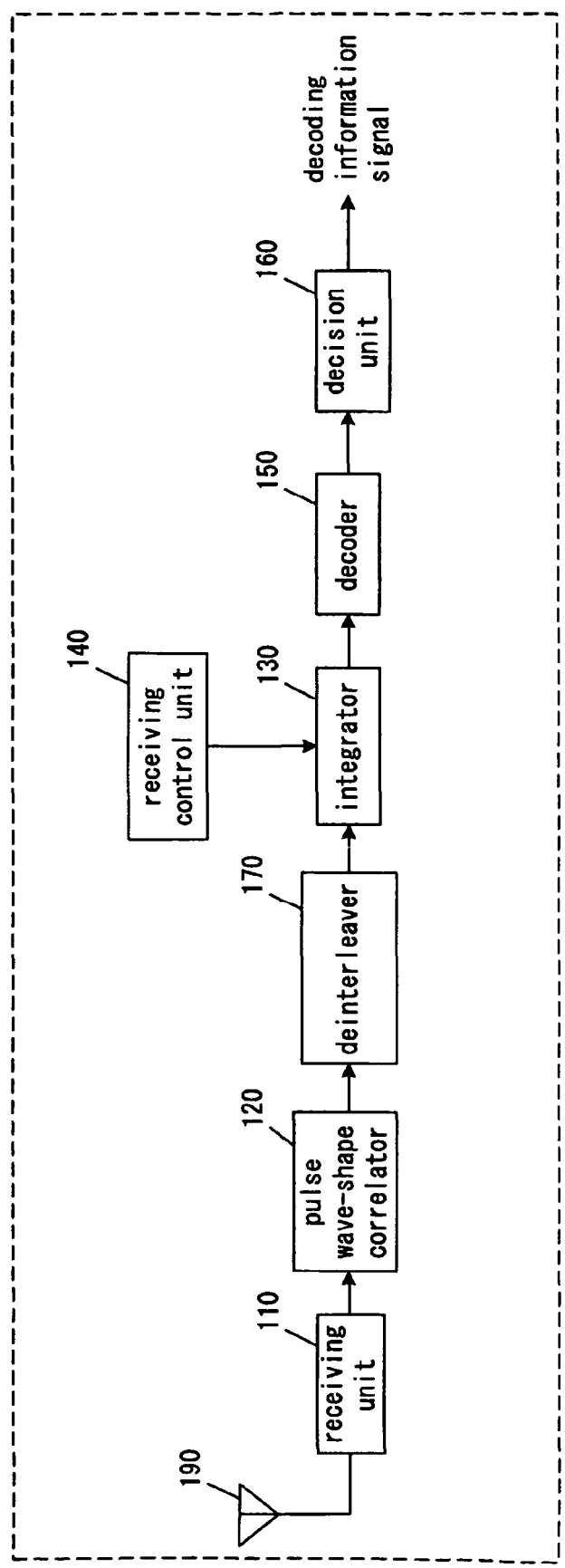
FIG. 9 is a block diagram of a receiving device according to Embodiment 8 of the present invention.

FIG. 9 is a block diagram of s receiving device according to Embodiment 8 of the present invention. In FIG. 9, explanation of components same as shown in FIG. 6 is omitted attaching same symbols as in FIG. 6.

As shown in FIG. 9, the receiving device according to the present embodiment comprises: a receiving unit 110, a pulse wave-shape correlator 120, a deinterleaver 170, a receiving control unit 140, an integrator 130, a decoder 150, and a decision unit 190.

The receiving unit 110 is operable to receive a transmit signal as an received pulse train, the transmit signal being an second time-series pulse train transmitted after a k-bit information bit train is encoded to an n-bit encoded bit train at a coded rate of (k/n) ("k" is a natural number not less than 1, and "n" is a natural number not less than 2), and subsequently interleaved and transformed to the second time-series pulse train.

The pulse wave-shape correlator is operable to correlate individually pulses composing the received pulse train with a predetermined template wave shape, thereby outputting a second time-series correlation value train in correspondence with the n-piece received pulse train.

The deinterleaver 170 is operable to deinterleave the n-piece second time-series correlation value train, thereby outputting n-piece first time-series repetitive correlation value trains.

The receiving control unit 140 is operable to output, based on bit train information received beforehand, n-piece repetition numbers for the n-piece first time-series repetitive correlation value trains outputted by the deinterleaver 170.

The integrator 130 is operable to divide into n intervals the n-piece first time-series repetitive correlation value trains outputted by the deinterleaver 170, in accordance with the n-piece repetition numbers outputted by the receiving control unit 140, and to integrate the n-piece first time-series repetitive correlation value trains for each divided interval, thereby outputting n-piece integrated values.

The decoder 150 is operable to make soft decision for the n-piece received repetitive pulse trains based on the n-piece integrated values outputted by the integrator 130, thereby outputting the soft decision results for n bits.

The decision unit 160 is operable to make hard decision in decoding for the n-piece received pulse trains based on the soft decision results for n bits outputted by the decoder 150, thereby outputting the k-bit information bit train as a decoded information signal.

In the receiving device of the present embodiment, the deinterleaver 170 is newly added between the pulse wave-shape correlator 120 and the integrator 130, compared with the receiving device of Embodiment 6 of the present invention shown in FIG. 6. Therefore, the operation of the receiving device of the present embodiment in steps posterior to the deinterleaver 170 is same as the corresponding operation of the receiving device of Embodiment 6 of the present invention.

The operation of the receiving device of the present embodiment is explained referring to FIG. 9.

The receiving unit 110 receives, as the received pulse train, the second time-series pulse train which is transmitted by a partner's transmitting device, same as of the present embodiment shown in FIG. 8.

The pulse wave-shape correlator 120 correlates each pulse of the received pulse train that is received by the receiving unit 110 and the template wave shape that is predetermined, and outputs the correlation value. A series of correlation values outputted by the pulse wave-shape correlator 120 constitutes a second time-series correlation value train.

The deinterleaver 170 deinterleaves the second time-series correlation value train to output first time-series repetitive correlation value trains.

The receiving control unit 140 determines the number of repetitive bits of the n-piece bit trains corresponding to the first time-series correlation value trains, based on the bit train information which is transmitted beforehand from the partner's transmitting device, and outputs the number of repetitive bits to the integrator 130.

The integrator 130 integrates the first time-series repetitive correlation value trains as many as the number of repetitive bits of the n-piece bit trains which the receiving control unit 140 has outputted, and outputs n-piece integrated values.

The decoder 150 makes soft decision based on the n-piece integrated values, and outputs the soft decision result for n-bit.

The decision unit 160 makes hard decision that is the final decoding for the received pulse train based on the soft decision result of n-bit outputted by the decoder 150, and outputs the k-bit information bit train as the decoding information signal.

Figure 15:
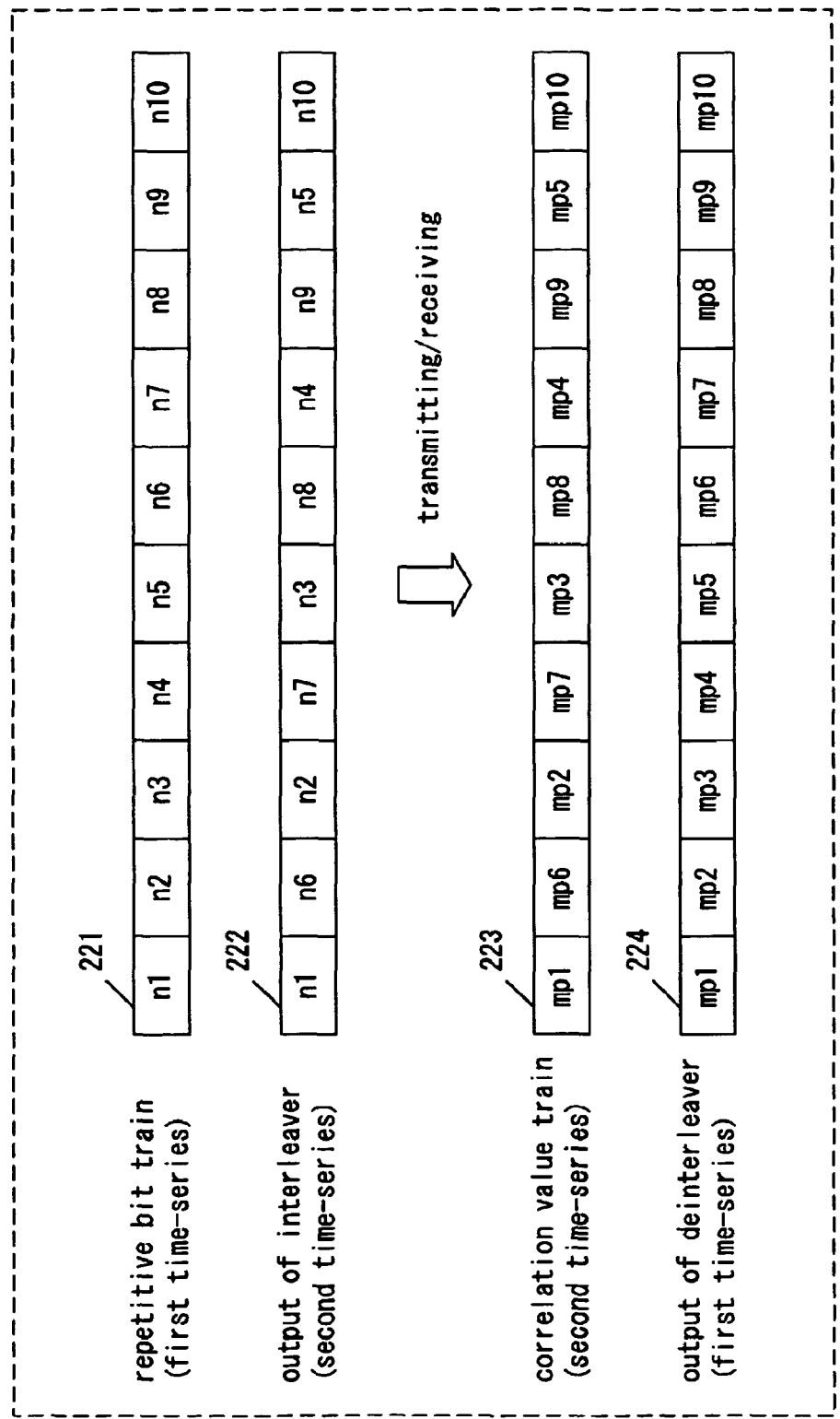
FIG. 15 is an explanatory drawing of an interleaver and a deinterleaver according to Embodiment 8 of the present invention.
Figure 16:
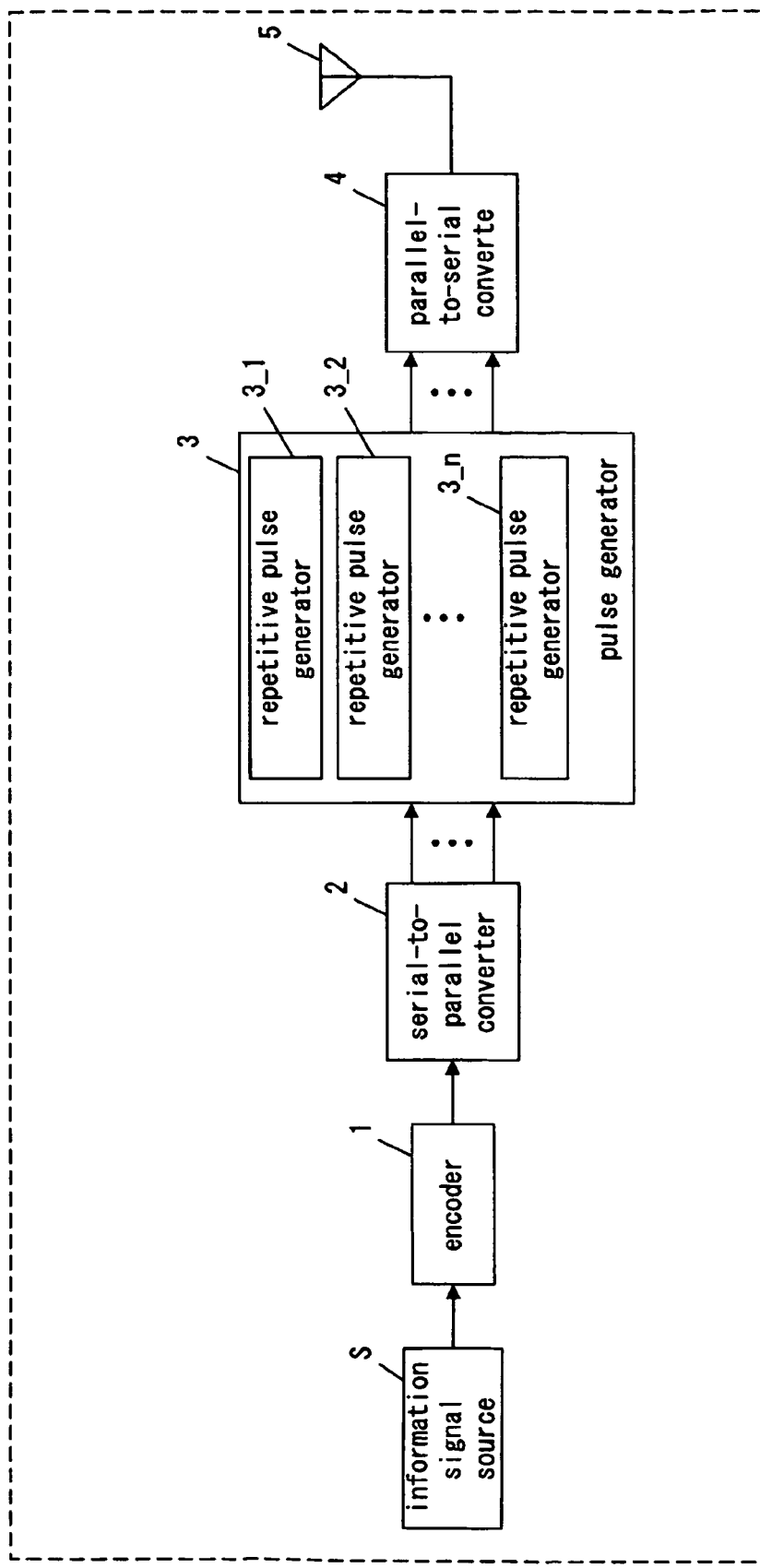
FIG. 16 is a block diagram of the conventional UWB transmitting device.
Figure 17:
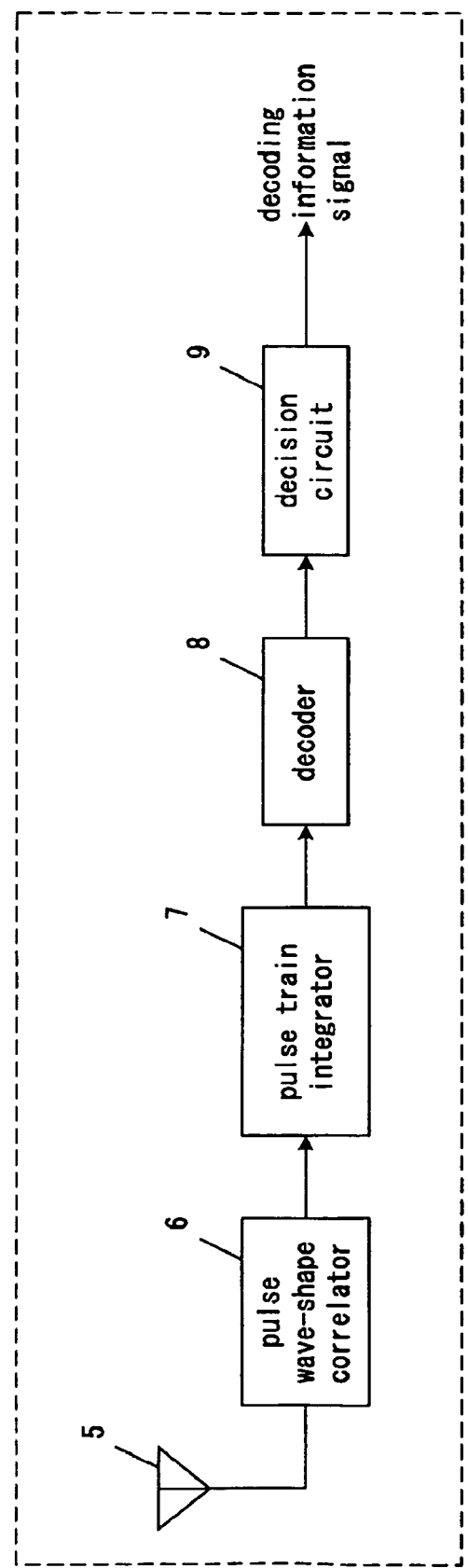
FIG. 17 is a block diagram of the conventional UWB receiving device.

Next, operation of the interleaver 80 of the transmitting device and the deinterleaver 170 of the receiving device of the present embodiment is briefly explained referring to FIG. 15. FIG. 15 is an explanatory drawing of an interleaver and a deinterleaver according to Embodiment 8 of the present invention.

Now, it is assumed that the first time-series repetitive bit train generated by the bit train generator 70 of FIG. 8 is a repetitive bit train 221 "n1, n2, n3, n4, n5, n6, n7, n8, n9, n10", as shown in FIG. 15.

The interleaver 80 changes the time-series of the first time-series repetitive bit train 221 and outputs an interleaver output 222 "n1, n6, n2, n7, n3, n8, n4, n9, n5, n10", as the second time-series bit train, according to a predetermined conversion rule. In the present example, the first time-series repetitive bit train 221 is divided into two parts, and bits are taken out in head-to-tail order, alternately from the first part and the second part to reassemble the interleaver output 222 as the second time-series bit train.

Each bit in the interleaver output 222 is converted into either a P pulse 204 or a Q pulse 205 by the pulse generator 30, and then transmitted. Therefore, the pulse train transmitted from the transmitting device is the second time-series train.

In the receiving device, the receiving unit 110 receives the second time-series pulse train as the received pulse train. The pulse wave-shape correlator 120 correlates each pulse of the received pulse train and the template wave shape, and outputs as a correlation value train 223 "mp1, mp6, mp2, mp7, mp3, and "mp8, mp4, mp9, mp5, mp10" as shown in FIG. 15. The correlation value train 223 is the second time-series train.

The deinterleaver 170 conversely follows the conversion rule which the interleaver 80 has used, changes the time-series of the second time-series correlation value train 223, and outputs the deinterleaver output 224 "mp1, mp2, mp3, and "mp4, mp5, mp6, mp7, mp8, mp9, mp10", as the first time-series correlation value train.

Thus, in the transmitting device of the present embodiment, the first time-series bit train is interleaved to the second time-series bit train, which is subsequently converted to the second time-series pulse train and transmitted. In the receiving device of the present embodiment, the second time-series correlation value train is deinterleaved to the first time-series correlation value train.

Attaching the interleaver 80 to the transmitting device can produce both of the time diversity effectiveness and the burst error suppression effectiveness over coded bits, and hence, the error rate characteristics of the signal received by the receiving device can be improved further. Therefore, the transmitting device and the receiving device of the present embodiment are effective in noise environment especially conspicuous for burst-type noise.

As explained above, the purport of the present embodiment is to realize the transmitting device and the receiving device that can perform communication of information using the UWB-IR method while controlling the number of repetitive pulses of the repetitive pulse trains according to the state of the communication path; therefore, as long as it does not exceed the purport of the present invention, various applications can be realized.

According to the present invention, the transmitting device and the receiving device for use in a super wideband communication system can be provided, which realize high quality data transmission without reducing the transmission speed by lifting restrictions over the number of the repetitive pulses in the UWBB-IR method.

INDUSTRIAL APPLICABILITY

The transmitting device and the receiving device related to the present invention can be used, for example, in a field of high-speed indoor multi-points-connection radio communication, which performs communication using the UWB-IR method, and in its applicable field.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

The invention claimed is:

1. A transmitting device usable in an ultra-wideband communication system performing communications by sending repetitive pulse trains to a communication path, said transmitting device comprising:
an encoder operable to encode a k-bit information bit train to an n-bit encoded bit train at a coded rate of (k/n) ("k" is a natural number not less than 1, and "n" is a natural number not less than 2), on condition that m-piece pulses are transmitted per one bit of information bits ("m" is a natural number not less than 2) and the coded rate is (k/n); and
a transmitting unit operable to generate n-piece repetitive pulse trains based on the n-bit encoded bit train encoded by said encoder, thereby transmitting sequentially the n-piece repetitive pulse trains to the communication path,
wherein pulses included in the n-piece repetitive pulse trains transmitted by said transmitting unit amount to (k*m) pieces in total,
wherein the n-piece repetitive pulse trains are composed by performing, in accordance with a state of the communication path, weighting on a plurality of encoded bits, the weighting being performed such that, for each of the encoded bits, a number of repetitive pulses allotted to the encoded bit is based on the susceptibility of the encoded bit to an adverse effect including interference from another user, with an encoded bit that is susceptible to the adverse effect being allotted more repetitive pulses than an encoded bit that is not susceptible to the adverse effect, thereby adaptively adjusting the number of repetitive pulses of each of the n-piece repetitive pulse trains,
wherein the repetitive pulse trains themselves constitute radio waves transmitted from an antenna,
wherein said transmitting device further comprises a transmitting control unit operable to generate control information on number of the repetitive pulses included in each train of the n-piece repetitive pulse trains transmitted by said transmitting unit,
wherein said transmitting control unit comprises a pulse generator operable, in accordance with the control information generated by said transmitting control unit, to repetitively generate a plurality of pulses for each encoded bit of the n-bit encoded bit train encoded by said encoder, thereby outputting the n-piece repetitive pulse trains, the plurality of pulses being predetermined according to a kind of each encoded bit, and
wherein said transmitting control unit is operable to transmit, as pulse train information, the number of repetitive pulses of the n-piece repetitive pulse trains generated by said pulse generator.

2. A transmitting device usable in an ultra-wideband communication system performing communications by sending repetitive pulse trains to a communication path, said transmitting device comprising:
an encoder operable to encode a k-bit information bit train to an n-bit encoded bit train at a coded rate of (k/n) ("k" is a natural number not less than 1, and "n" is a natural number not less than 2), on condition that m-piece pulses are transmitted per one bit of information bits ("m" is a natural number not less than 2) and the coded rate is (k/n); and
a transmitting unit operable to generate n-piece repetitive pulse trains based on the n-bit encoded bit train encoded by said encoder, thereby transmitting sequentially the n-piece repetitive pulse trains to the communication path,
wherein pulses included in the n-piece repetitive pulse trains transmitted by said transmitting unit amount to (k*m) pieces in total,
wherein the n-piece repetitive pulse trains are composed by performing, in accordance with a state of the communication path, weighting on a plurality of encoded bits, the weighting being performed such that, for each of the encoded bits, a number of repetitive pulses allotted to the encoded bit is based on the susceptibility of the encoded bit to an adverse effect including interference from another user, with an encoded bit that is susceptible to the adverse effect being allotted more repetitive pulses than an encoded bit that is not susceptible to the adverse effect, thereby adaptively adjusting the number of repetitive pulses of each of the n-piece repetitive pulse trains,
wherein the repetitive pulse trains themselves constitute radio waves transmitted from an antenna,
wherein said transmitting device further comprises a transmitting control unit operable to generate control information on number of the repetitive pulses included in each train of the n-piece repetitive pulse trains transmitted by said transmitting unit,
wherein said encoder outputs the n-bit encoded bit train in the form of an n-bit parallel format encoded bit train, and
wherein said transmitting unit comprises:
a pulse generator operable to repetitively generate a plurality of pulses for each encoded bit of the n-bit parallel format encoded bit train outputted by said encoder, thereby outputting n-piece parallel format repetitive pulse trains, the plurality of pulses being predetermined according to a kind of each encoded bit; and
a parallel-to-serial converter operable to convert the n-piece parallel format repetitive pulse trains outputted by said pulse generator to n-piece serial format repetitive pulse trains, thereby sequentially transmitting the n-piece serial format repetitive pulse trains to the communication path,
wherein said pulse generator determines, in accordance with the control information generated by said transmitting control unit, the number of each repetitive pulses composing the n-piece repetitive pulse trains, in such a manner that pulses included in the n-piece repetitive pulse trains amount to (k*m) pieces in total, and at least two pieces of the n-piece repetitive pulse trains are composed of repetitive pulses of different numbers.

3. A transmitting device usable in an ultra-wideband communication system performing communications by sending repetitive pulse trains to a communication path, said transmitting device comprising:
- an encoder operable to encode a k-bit information bit train to an n-bit encoded bit train at a coded rate of (k/n) ("k" is a natural number not less than 1, and "n" is a natural number not less than 2), on condition that m-piece pulses are transmitted per one bit of information bits ("m" is a natural number not less than 2) and the coded rate is (k/n); and
- a transmitting unit operable to generate n-piece repetitive pulse trains based on the n-bit encoded bit train encoded by said encoder, thereby transmitting sequentially the n-piece repetitive pulse trains to the communication path,
- wherein pulses included in the n-piece repetitive pulse trains transmitted by said transmitting unit amount to (k*m) pieces in total,
- wherein the n-piece repetitive pulse trains are composed by performing, in accordance with a state of the communication path, weighting on a plurality of encoded bits, the weighting being performed such that, for each of the encoded bits, a number of repetitive pulses allotted to the encoded bit is based on the susceptibility of the encoded bit to an adverse effect including interference from another user, with an encoded bit that is susceptible to the adverse effect being allotted more repetitive pulses than an encoded bit that is not susceptible to the adverse effect, thereby adaptively adjusting the number of repetitive pulses of each of the n-piece repetitive pulse trains,
- wherein the repetitive pulse trains themselves constitute radio waves transmitted from an antenna,
- wherein said transmitting device further comprises a transmitting control unit operable to generate control information on number of the repetitive pulses included in each train of the n-piece repetitive pulse trains transmitted by said transmitting unit,
- wherein said encoder outputs the n-bit encoded bit train in the form of an n-bit serial format encoded bit train, and
- wherein said transmitting unit comprises:
  - a serial-to-parallel converter operable to convert the n-bit serial format encoded bit train outputted by said encoder to an n-bit parallel format encoded bit train,
  - a pulse generator operable to repetitively generate a plurality of pulses for each encoded bit of the n-bit parallel format encoded bit train outputted by said encoder, thereby outputting n-piece parallel format repetitive pulse trains, the plurality of pulses being predetermined according to a kind of each encoded bit; and
  - a parallel-to-serial converter operable to convert the n-piece parallel format repetitive pulse trains outputted by said pulse generator to n-piece serial format repetitive pulse trains, thereby sequentially transmitting the n-piece serial format repetitive pulse trains to the communication path,
  - wherein said pulse generator determines, in accordance with the control information generated by said transmitting control unit, the number of each repetitive pulses composing the n-piece repetitive pulse trains, in such a manner that pulses included in the n-piece repetitive pulse trains amount to (k*m) pieces in total, and at least two pieces of the n-piece repetitive pulse trains are composed of repetitive pulses of different numbers.

4. A transmitting device usable in an ultra-wideband communication system performing communications by sending repetitive pulse trains to a communication path, said transmitting device comprising:
- an encoder operable to encode a k-bit information bit train to an n-bit encoded bit train at a coded rate of (k/n) ("k" is a natural number not less than 1, and "n" is a natural number not less than 2), on condition that m-piece pulses are transmitted per one bit of information bits ("m" is a natural number not less than 2) and the coded rate is (k/n); and
- a transmitting unit operable to generate n-piece repetitive pulse trains based on the n-bit encoded bit train encoded by said encoder, thereby transmitting sequentially the n-piece repetitive pulse trains to the communication path,
- wherein pulses included in the n-piece repetitive pulse trains transmitted by said transmitting unit amount to (k*m) pieces in total,
- wherein the n-piece repetitive pulse trains are composed by performing, in accordance with a state of the communication path, weighting on a plurality of encoded bits, the weighting being performed such that, for each of the encoded bits, a number of repetitive pulses allotted to the encoded bit is based on the susceptibility of the encoded bit to an adverse effect including interference from another user, with an encoded bit that is susceptible to the adverse effect being allotted more repetitive pulses than an encoded bit that is not susceptible to the adverse effect, thereby adaptively adjusting the number of repetitive pulses of each of the n-piece repetitive pulse trains,
- wherein the repetitive pulse trains themselves constitute radio waves transmitted from an antenna,
- wherein said transmitting device further comprises a transmitting control unit operable to generate control information on number of the repetitive pulses included in each train of the n-piece repetitive pulse trains transmitted by said transmitting unit, and
- wherein said transmitting unit comprises:
  - a bit train generator operable to repeat, for a plurality of times, each bit of the n-bit encoded bit train encoded by said encoder to generate n-piece repetitive bit trains; and
  - a pulse generator operable to generate a pulse for each bit of the n-piece repetitive bit trains generated by said bit train generator, the pulse being predetermined according to a kind of each bit, thereby transmitting the generated pulse to the communication path,
  - wherein said bit train generator determines, in accordance with the control information generated by said transmitting control unit, the number of each repetitive bits composing the n-piece repetitive bit trains, in such a manner that bits included in the n-piece repetitive bit trains amount to (k*m) pieces in total, and at least two pieces of the n-piece repetitive bit trains are composed of repetitive bits of different numbers.

5. The transmitting device as defined in claim 4, wherein said transmitting control unit is operable to transmit, as bit train information, the number of repetitive bits of the n-piece repetitive bit trains generated by said bit train generator.

* * * * *